(12) United States Patent
Park et al.

(10) Patent No.: US 12,194,924 B2
(45) Date of Patent: Jan. 14, 2025

(54) DEVICE PROVIDED IN VEHICLE AND METHOD FOR CONTROLLING SAME

(71) Applicant: LG Electronics Inc., Seoul (KR)

(72) Inventors: Junbum Park, Seoul (KR); Hyoungkyu Choi, Seoul (KR); Seongmin Kim, Seoul (KR); Jaeho Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 741 days.

(21) Appl. No.: 17/424,365

(22) PCT Filed: Jan. 30, 2019

(86) PCT No.: PCT/KR2019/001246
§ 371 (c)(1),
(2) Date: Jul. 20, 2021

(87) PCT Pub. No.: WO2020/158969
PCT Pub. Date: Aug. 6, 2020

(65) Prior Publication Data
US 2022/0118913 A1    Apr. 21, 2022

(51) Int. Cl.
*B60R 1/27* (2022.01)
*B60K 35/10* (2024.01)
(Continued)

(52) U.S. Cl.
CPC ............. *B60R 1/27* (2022.01); *B60K 35/60* (2024.01); *B60K 35/10* (2024.01); *B60K 35/28* (2024.01);
(Continued)

(58) Field of Classification Search
CPC .......... B60R 1/27; B60K 35/60; B60K 35/10; B60K 35/28; B60K 35/29; B60K 35/81;
(Continued)

(56) References Cited

U.S. PATENT DOCUMENTS

2011/0166748 A1    7/2011   Schneider et al.
2012/0262487 A1    10/2012  Huebner
(Continued)

FOREIGN PATENT DOCUMENTS

KR    1020150009121    1/2015

OTHER PUBLICATIONS

PCT International Search Report and Written Opinion in International Appln. No. PCT/KR2019/001246, dated Oct. 28, 2019, 16 pages (with English translation).
(Continued)

*Primary Examiner* — David V Henze-Gongola
(74) *Attorney, Agent, or Firm* — Fish & Richardson P.C.

(57) ABSTRACT

Proposed are a device provided in a vehicle and a method for controlling same. A device provided in a vehicle according to one embodiment of the present disclosure comprises: a first module which executes a first application and outputs first video data corresponding to the first application; and a second module which is wired or wirelessly connected to the first module and outputs video data, which is the same as the first video data, at a first timing. The second module is designed to output second video data which is different from the first video data in response to, for example, an event which has occurred at a second timing after the first timing.

14 Claims, 18 Drawing Sheets

(51) Int. Cl.
*B60K 35/28* (2024.01)
*B60K 35/29* (2024.01)
*B60K 35/60* (2024.01)
*B60K 35/81* (2024.01)

(52) U.S. Cl.
CPC .............. *B60K 35/29* (2024.01); *B60K 35/81* (2024.01); *B60K 2360/1438* (2024.01); *B60K 2360/176* (2024.01); *B60K 2360/182* (2024.01); *B60R 2300/102* (2013.01); *B60R 2300/207* (2013.01); *B60R 2300/301* (2013.01); *B60R 2300/406* (2013.01); *B60R 2300/408* (2013.01); *B60Y 2200/11* (2013.01); *B60Y 2400/3015* (2013.01)

(58) Field of Classification Search
CPC ...... B60K 2360/1438; B60K 2360/176; B60K 2360/182
See application file for complete search history.

(56) References Cited

U.S. PATENT DOCUMENTS

| | | | |
|---|---|---|---|
| 2014/0354452 A1* | 12/2014 | Okuyama | G08G 1/143 340/932.2 |
| 2015/0015479 A1* | 1/2015 | Cho | G06F 3/013 345/156 |
| 2015/0081167 A1 | 3/2015 | Pisz | |
| 2016/0063947 A1* | 3/2016 | Lin | B60K 35/10 345/520 |

OTHER PUBLICATIONS

Extended European Search Report in European Appln. No. 19913719.1, dated Aug. 10, 2022, 18 pages.

* cited by examiner

FIG. 1
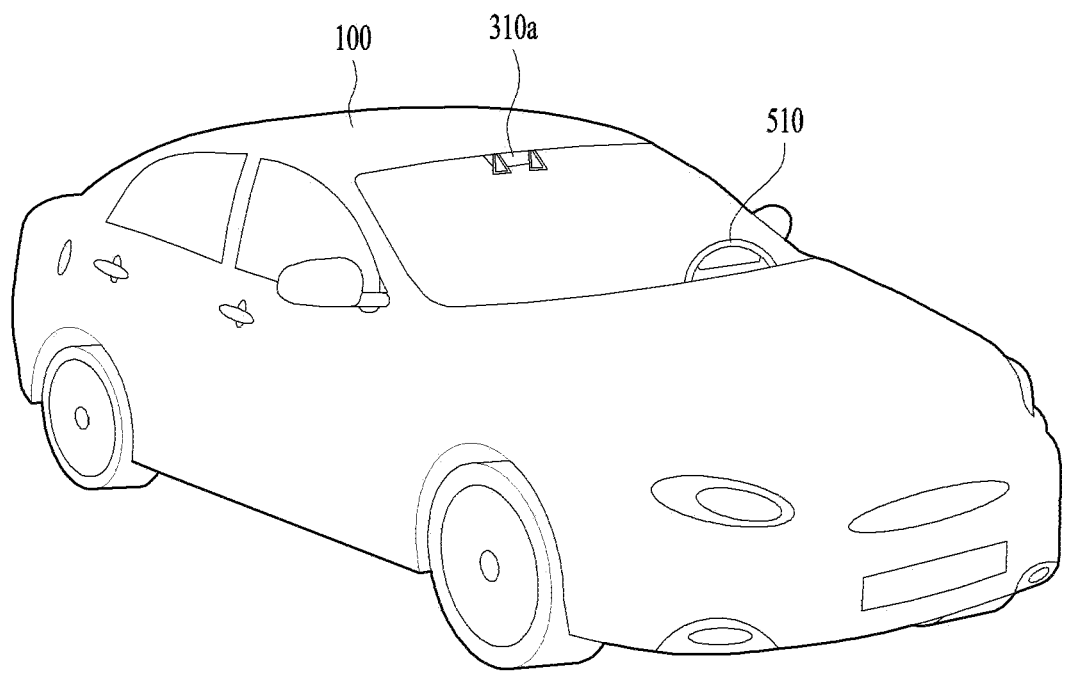
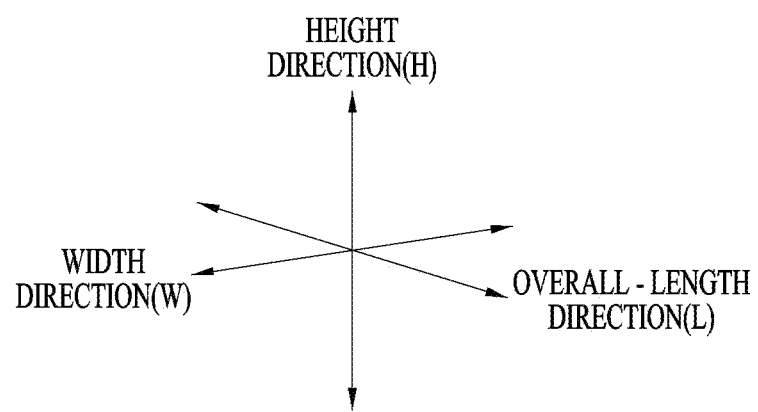

FIG. 12
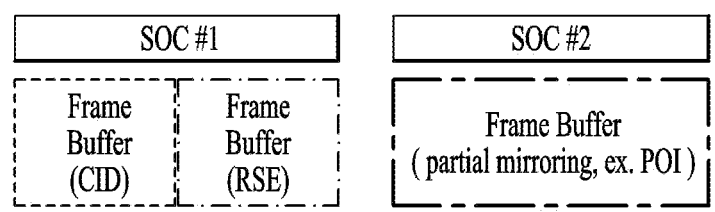
or
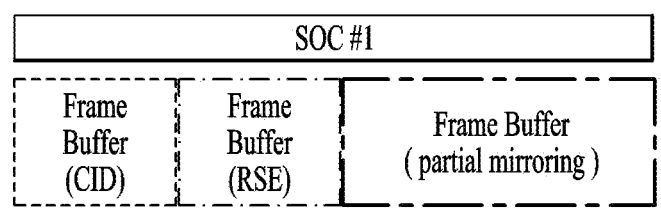

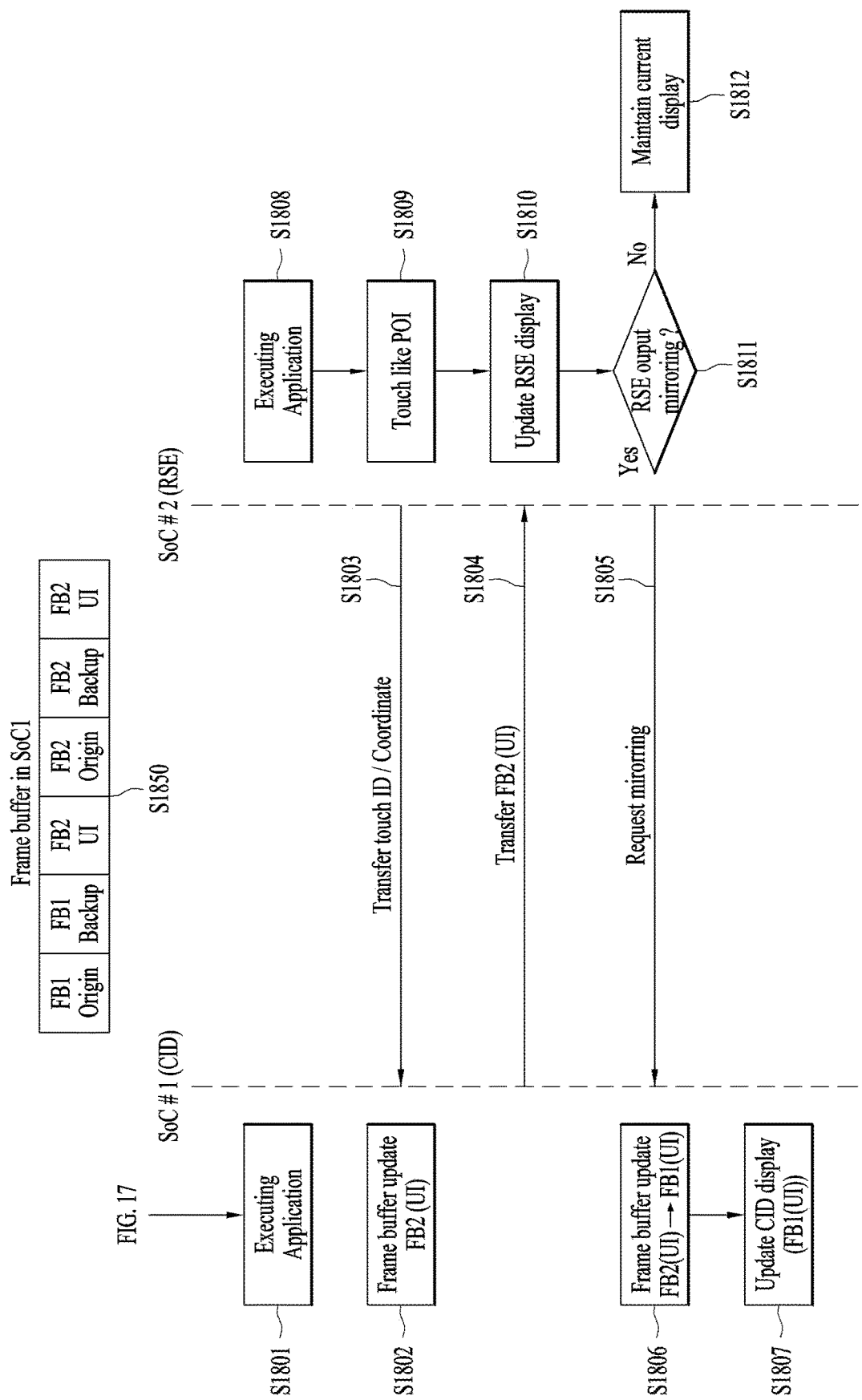

DEVICE PROVIDED IN VEHICLE AND METHOD FOR CONTROLLING SAME

CROSS-REFERENCE TO RELATED APPLICATIONS

This application is a National Stage application under 35 U.S.C. § 371 of International Application No. PCT/KR2019/001246, filed on Jan. 30, 2019, the disclosure of which is incorporated by reference in its entirety.

TECHNICAL FIELD

The present disclosure relates to a device provided in a vehicle and a method of controlling the same. For example, the present disclosure is applicable to a case in which at least two displays are mounted in a vehicle. More specifically, the displays may be, for example, a central information display (CID) installed around a driver's seat and a rear seat entertainment (RSE) installed around a rear seat.

BACKGROUND

Although a vehicle traditionally functions as a transportation means for a user, the vehicle is now equipped with various sensors and electronic devices to offer driving convenience to the user. Particularly, an advanced driver assistance system (ADAS) and an autonomous driving vehicle are under active development, for the driving convenience of users.

The ADAS and the autonomous driving vehicle provide various display devices, for the convenience of a passenger as well as the driving convenience of a user. The display devices are also called in-car entertainment (ICE) or in-vehicle infotainment (IVI). The ICE or the IVI may refer to automotive hardware and software that provide audio or video entertainment. Particularly, the IVI includes an automotive navigation system, a video player, universal serial bus (USB) and Bluetooth connections, Carputers, an in-vehicle Internet, and wireless fidelity (WiFi).

Even popular vehicles have recently been equipped with one display (e.g., CID) around the driver's seat and at least one display (e.g., RSE) around a rear seat (e.g., the back of a front seat). Conventionally, when the same application is executed on each display, the application is executed individually in a separate process or according to a simple mirroring method.

However, the individual processing of the same application in the CID and RSE increases consumption of memory resources.

Besides, a touch input on the CID or the RSE switches the CID and the RSE to the same screen in the mirroring method, which makes it difficult to satisfy the needs of the driver and a passenger in the rear seat.

SUMMARY

An embodiment of the present disclosure is intended to provide various scenarios for efficiently sharing data between a CID and an RSE, and particularly, to reduce consumption of memory resources by individually executing the same application in the CIS and the RSE in one process.

More specifically, another embodiment of the present disclosure is intended to solve a mirroring phenomenon in which upon receipt of a touch input on a CID or an RSE, the CID and the RSE are switched to the same screen.

Further, another embodiment of the present disclosure is intended to process the same application on a plurality of displays in one process and use a newly defined frame buffer for this purpose.

It will be appreciated by persons skilled in the art that the objects that could be achieved with the present disclosure are not limited to what has been particularly described hereinabove and the above and other objects that the present disclosure could achieve will be more clearly understood from the following detailed description.

According to an embodiment of the present disclosure, a method of controlling a device provided in a vehicle includes executing a first application by a first system-on-chip (SoC) installed in a dashboard of the vehicle, outputting first video data corresponding to the first application by the first SoC, generating a frame buffer for the first video data by the first SoC, transmitting the generated frame buffer to a second SoC installed on the back of a front seat in the vehicle by the first SoC, outputting the same video data as the first video data at a first time by the second SoC, and outputting second video data different from the first video data in response to an event that has occurred at a second time after the first time by the second SoC.

Further, according to an embodiment of the present disclosure, a device provided in a vehicle includes a first module configured to execute a first application and output outputting first video data corresponding to the first application, and a second module connected to the first module wiredly or wirelessly and configured to output the same video data as the first video data at a first time. The second module is configured to output second video data different from the first video data in response to an event that has occurred at a second time after the first time.

Therefore, according to an embodiment of the present disclosure, various scenarios for efficiently sharing data between a central information display (CID) and a rear seat entertainment (RSE) may be provided, and particularly, memory resource consumption may be reduced by individually executing the same application on the CID and the RSE in one process.

Further, according to another embodiment of the present disclosure, a mirroring phenomenon in which upon receipt of a touch input on a CID or an RSE, the CID and the RSE are switched to the same screen may be overcome.

Further, according to another embodiment of the present disclosure, the same application may be executed on a plurality of displays in one process, and for this purpose, a newly defined frame buffer is proposed.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram illustrating an exterior of a vehicle according to an aspect of the present disclosure.

FIG. 12 is a detailed diagram illustrating frame buffers used in FIG. 11.

FIG. 18 is a flowchart illustrating a process of transmitting an output user interface (UI) of an RSE to a CID by using a frame buffer.

DETAILED DESCRIPTION

Figure 2:
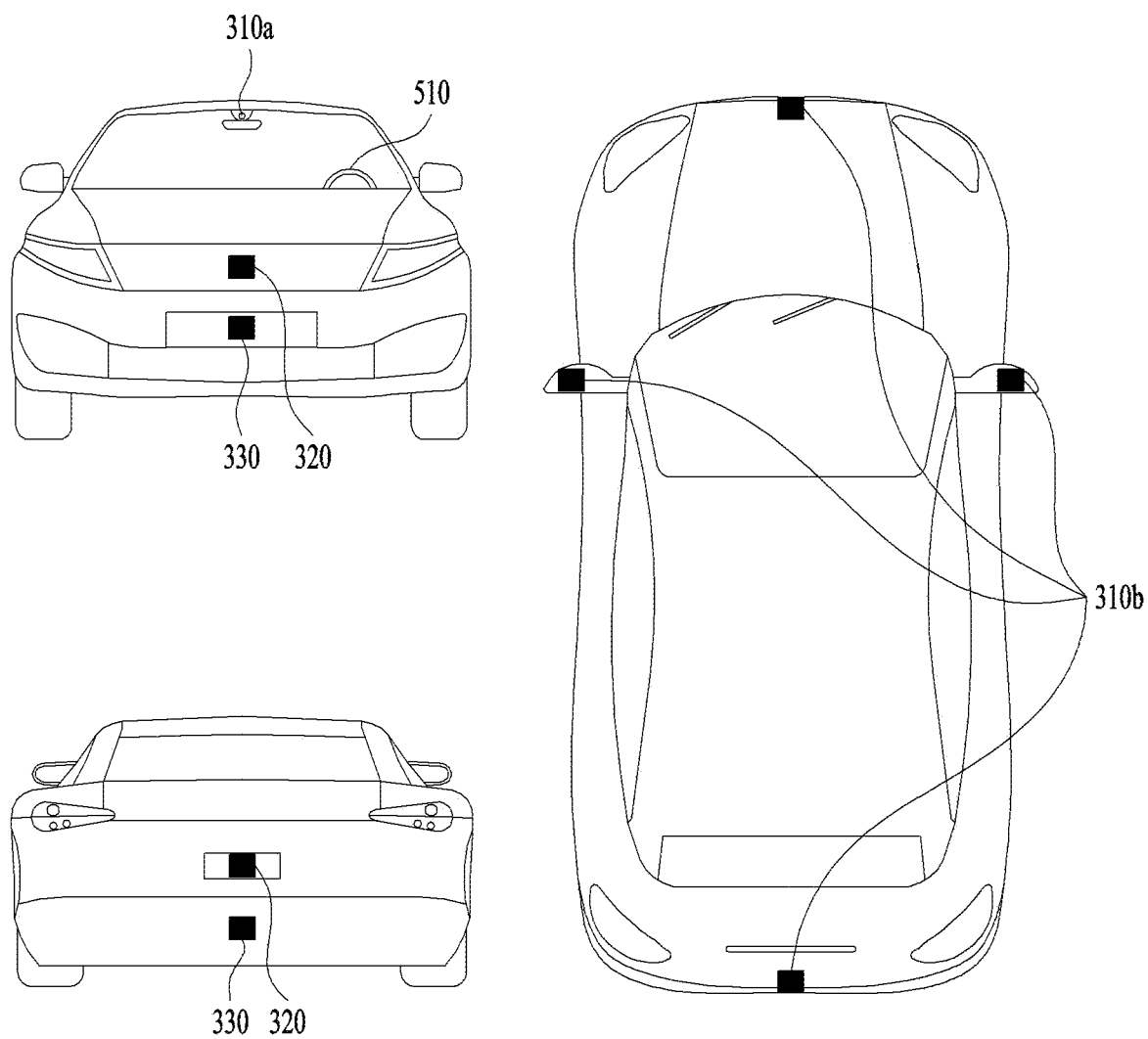
FIG. 2 is a diagram illustrating a vehicle externally viewed in various angles according to an aspect of the present disclosure.
Figure 3:
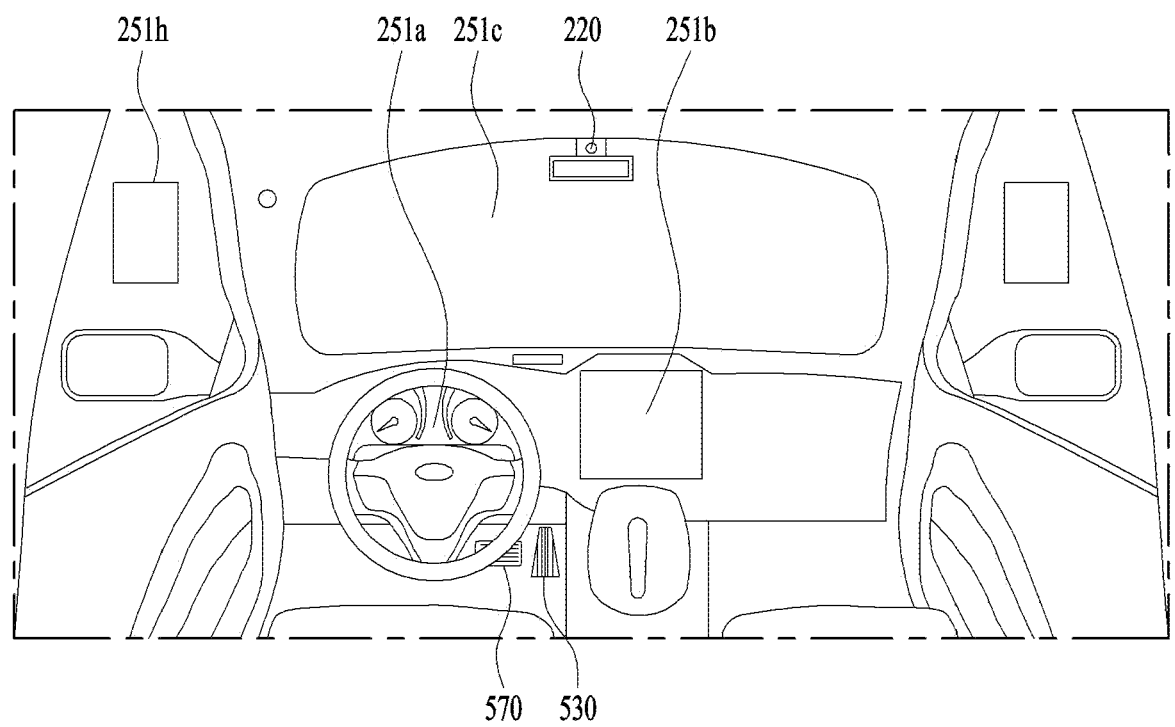
FIG. 3 and FIG. 4 are diagrams illustrating an interior of a vehicle according to an aspect of the present disclosure.
Figure 4:
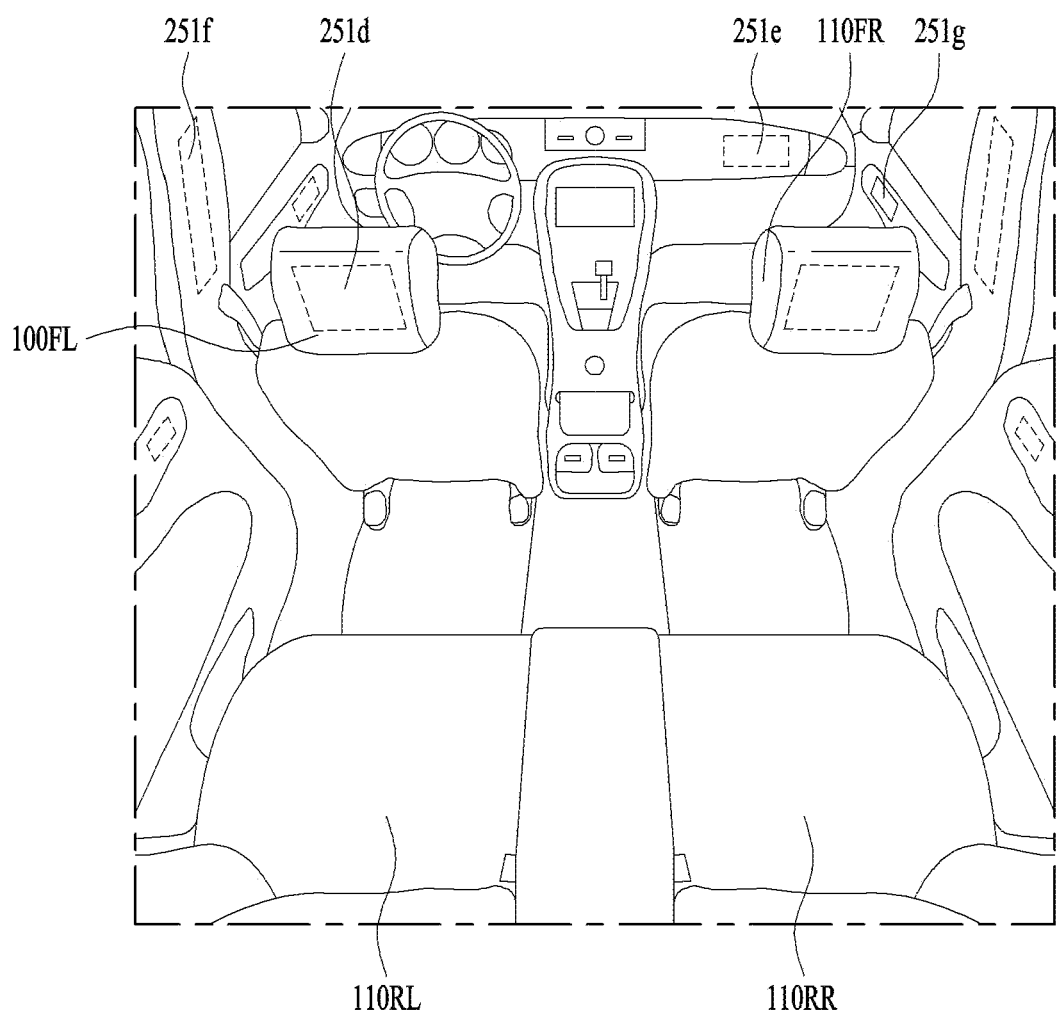

Preferred embodiments of the present disclosure will be described in detail with reference to the attached drawings. The following description given in conjunction with the drawings is intended to describe exemplary embodiments of the present disclosure, not describe the only embodiment in which the present disclosure may be implemented. The following detailed description includes details to assist in a comprehensive understanding of the present disclosure. However, those skilled in the art will understand that the present disclosure may be implemented without such details.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle. The vehicle 100 may be switched to an autonomous mode or a manual mode in response to a user input. For example, in response to a user input received through a user interface apparatus 200, the vehicle 100 may be switched from a manual mode to an autonomous mode, or vice versa.

The vehicle 100 may be switched to the autonomous mode or to the manual mode based on driving environment information. The driving environment information may include at least one of the following: information on an object outside a vehicle, navigation information, and vehicle state information.

For example, the vehicle 100 may be switched from the manual mode to the autonomous mode, or vice versa, based on driving environment information generated by the object detection device 300. In another example, the vehicle 100 may be switched from the manual mode to the autonomous mode, or vice versa, based on driving environment information received through a communication device 400.

The vehicle 100 may be switched from the manual mode to the autonomous mode, or vice versa, based on information, data, and a signal provided from an external device.

When the vehicle 100 operates in the autonomous mode, the autonomous vehicle 100 may operate based on an operation system 700. For example, the autonomous vehicle 100 may operate based on information, data, or signals generated by a driving system 710, a vehicle pulling-out system 740, and a vehicle parking system 750.

While operating in the manual mode, the autonomous vehicle 100 may receive a user input for driving of the vehicle 100 through a maneuvering device 500. In response to the user input received through the maneuvering device 500, the vehicle 100 may operate.

The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

Figure 7:
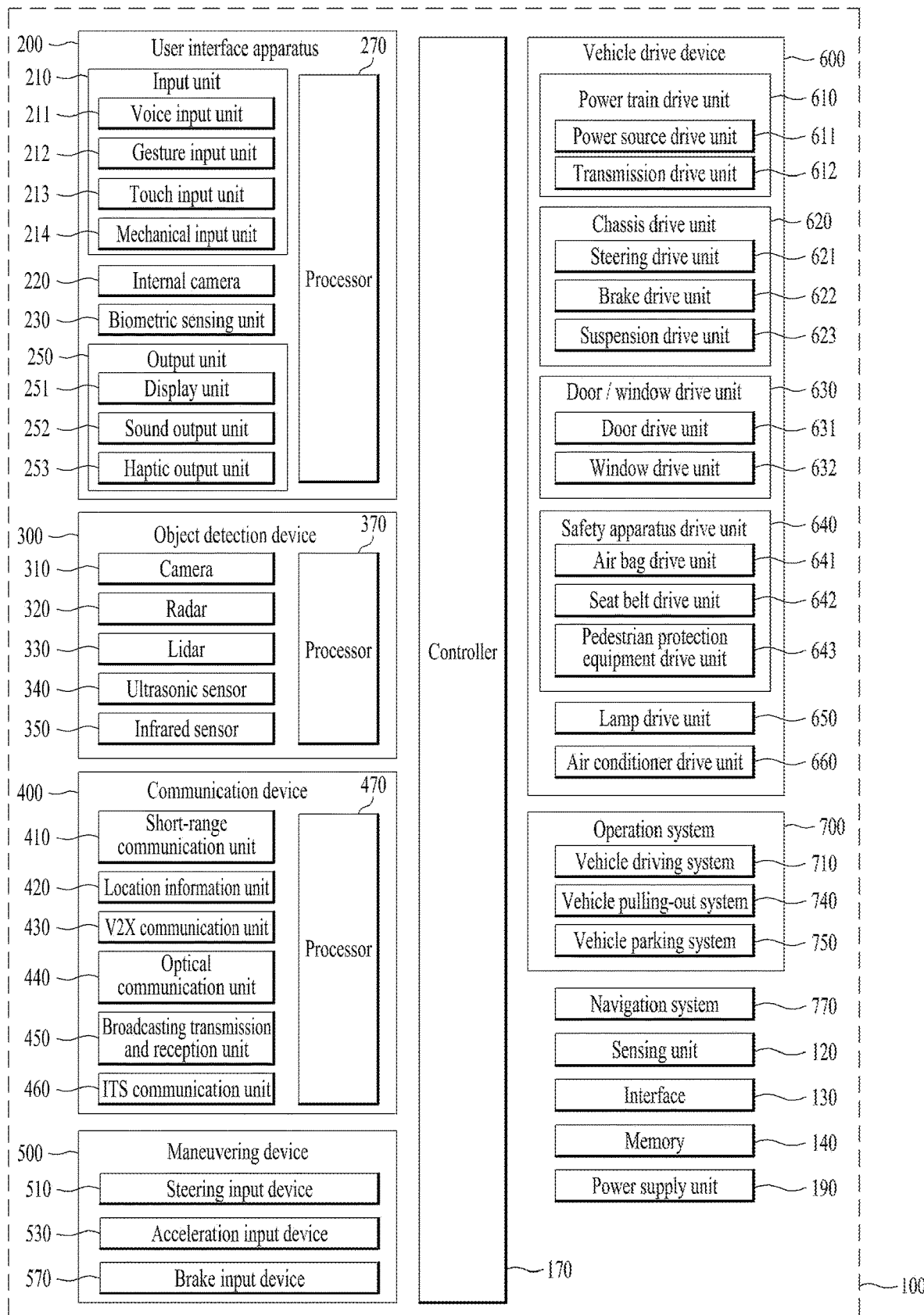
FIG. 7 is a block diagram referred to for description of a vehicle according to an aspect of the present disclosure.

As illustrated in FIG. 7, the vehicle 100 may include the user interface device 200, the object detection device 300, the communication device 400, the maneuvering device 500, a vehicle drive device 600, the operation system 700, a navigation system 770, a sensing unit 120, an interface 130, a memory 140, a controller 170, and a power supply unit 190.

In some embodiments, the vehicle 100 may further include other components in addition to the aforementioned components, or may not include some of the aforementioned components. The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, outside illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle condition information may be information that is generated based on data sensed by a variety of sensors inside a vehicle.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

Meanwhile, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170. In some embodiments, the memory 140 may be integrally formed with the controller 170, or may be provided as an element of the controller 170.

The controller 170 may control the overall operation of each unit inside the vehicle 100. The controller 170 may be referred to as an Electronic Controller (ECU). The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Moreover, the sensing unit 120, the interface unit 130, the memory 140, the power supply unit 190, the user interface device 200, the object detection device 300, the communication device 400, the maneuvering device 500, the vehicle drive device 600, the operation system 700 and the navigation system 770 may have individual processors or be integrated into the controller 170.

The user interface device 200 is provided to support communication between the vehicle 100 and a user. The user interface device 200 may receive a user input, and provide information generated in the vehicle 100 to the user. The vehicle 100 may enable User Interfaces (UI) or User Experience (UX) through the user interface device 200.

The user interface device 200 may include an input unit 210, an internal camera 220, a biometric sensing unit 230, an output unit 250, and a processor 270. Each component of the user interface device 200 may be separated from or integrated with the afore-described interface 130, structurally or operatively.

In some embodiments, the user interface device 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170. The voice input unit 211 may include one or more microphones.

The gesture input unit 212 may convert a gesture input of a user into an electrical signal. The converted electrical signal may be provided to the processor 270 or the controller 170. The gesture input unit 212 may include at least one selected from among an infrared sensor and an image sensor for sensing a gesture input of a user.

In some embodiments, the gesture input unit 212 may sense a three-dimensional (3D) gesture input of a user. To this end, the gesture input unit 212 may include a plurality of light emitting units for outputting infrared light, or a plurality of image sensors. The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170. The touch input unit 213 may include a touch sensor for sensing a touch input of a user. In some embodiments, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170. The mechanical input unit 214 may be located on a steering wheel, a center fascia, a center console, a cockpit module, a door, etc.

The processor 270 may start a learning mode of the vehicle 100 in response to a user input to at least one of the afore-described voice input unit 211, gesture input unit 212, touch input unit 213, or mechanical input unit 214. In the learning mode, the vehicle 100 may learn a driving route and ambient environment of the vehicle 100. The learning mode will be described later in detail in relation to the object detection device 300 and the operation system 700.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output. The output unit 250 may include at least one selected from among a display unit 251, a sound output unit 252, and a haptic output unit 253.

The display unit 251 may display graphic objects corresponding to various types of information. The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen. The display unit 251 may be implemented as a Head Up Display (HUD). When implemented as a HUD, the display unit 251 may include a projector module in order to output information through an image projected on a windshield or a window. The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

Meanwhile, the user interface device 200 may include a plurality of display units 251a to 251g.

The display unit 251 may be disposed in a region of a steering wheel, a region 251a, 251b or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface device 200. In some embodiments, the user interface device 200 may include a plurality of processors 270 or may not include the processor 270.

In a case where the user interface device 200 does not include the processor 270, the user interface device 200 may operate under control of the controller 170 or a processor of a different device inside the vehicle 100. Meanwhile, the user interface device 200 may be referred to as a display device for vehicle. The user interface device 200 may operate under control of the controller 170.

The object detection device 300 is used to detect an object outside the vehicle 100. The object detection device 300 may generate object information based on sensing data.

The object information may include information about the presence of an object, location information of the object, information on distance between the vehicle and the object, and the speed of the object relative to the vehicle 100. The object may include various objects related to travelling of the vehicle 100.

Figure 5:
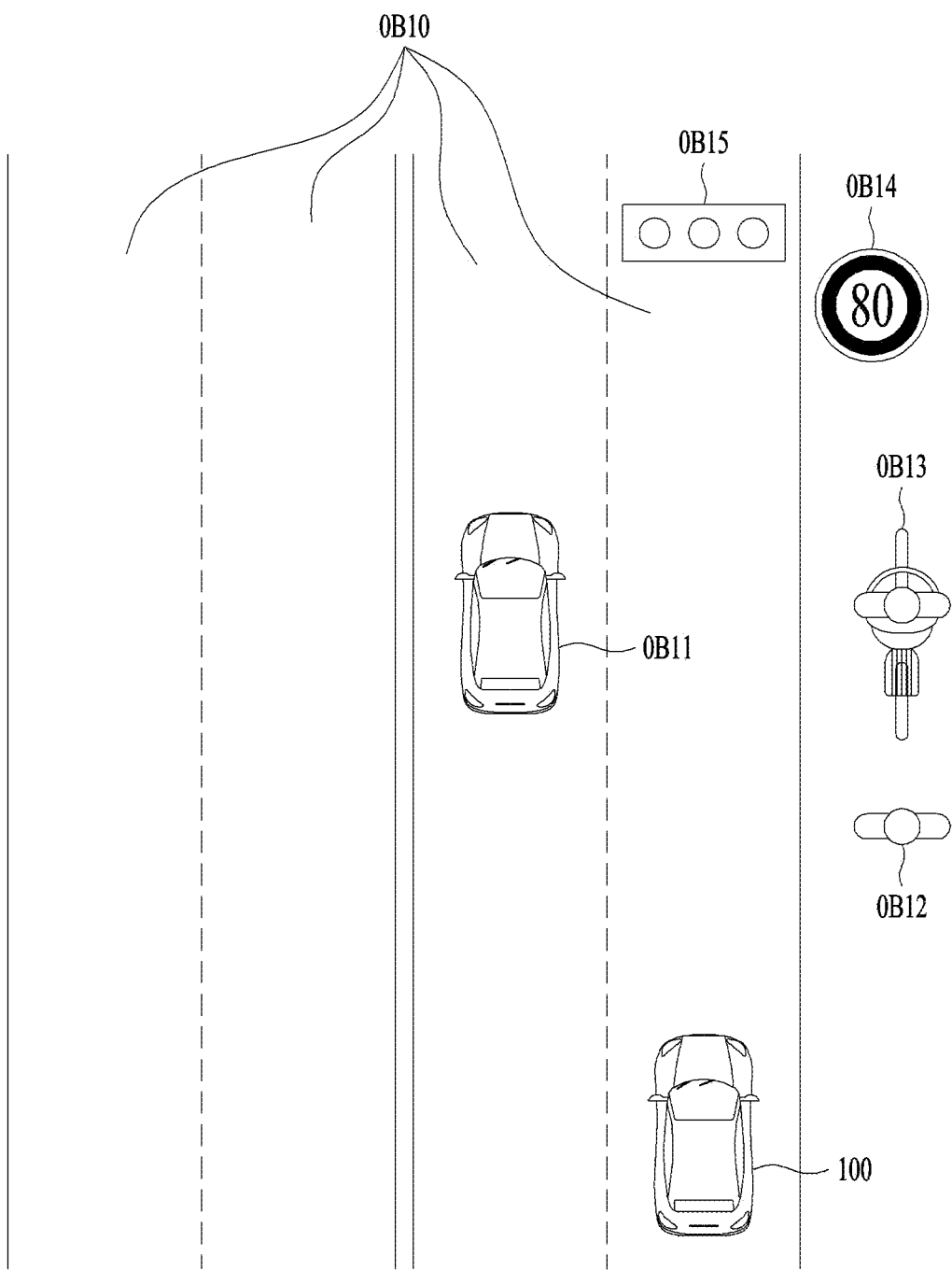
FIG. 5 and FIG. 6 are diagrams referred to for description of an object according to an aspect of the present disclosure.
Figure 6:
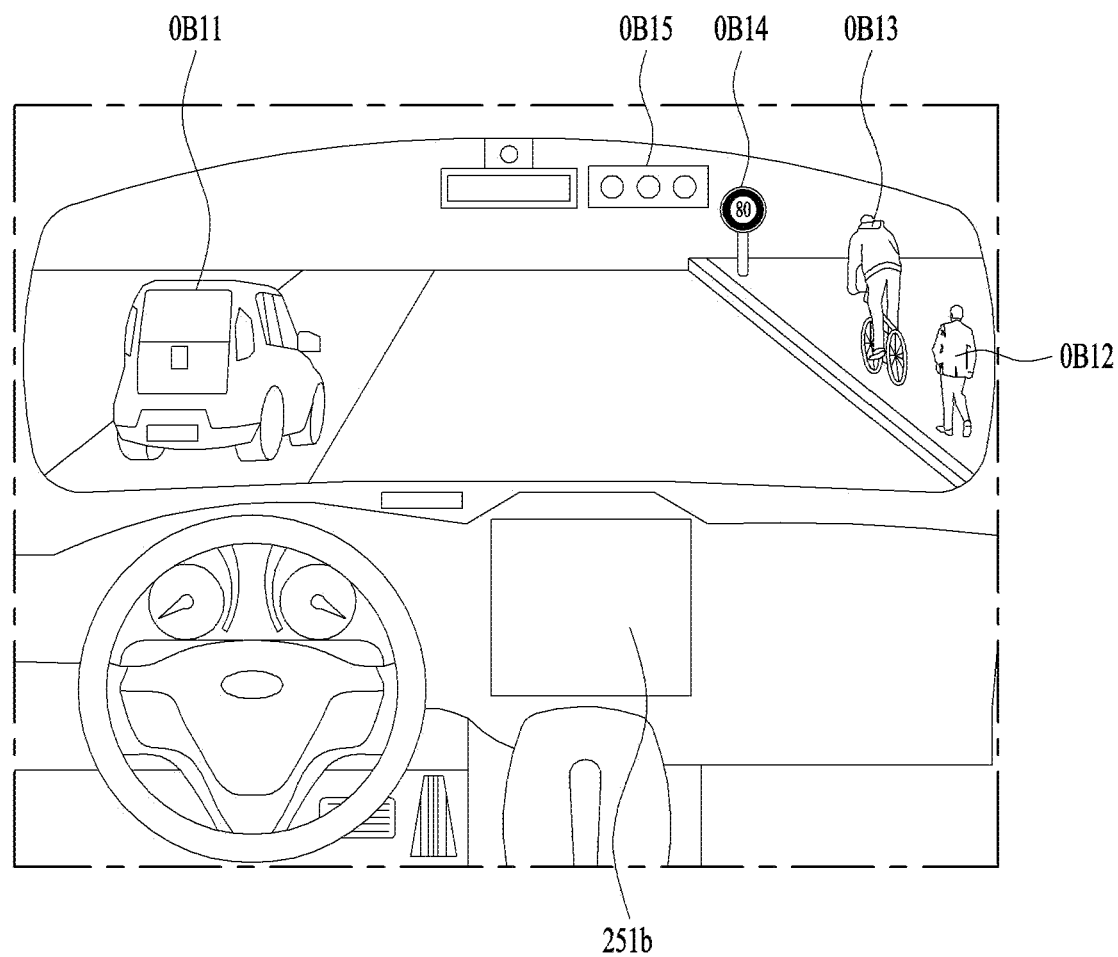

Referring to FIGS. 5 and 6, an object to may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling (hereinafter, referred to as the current driving lane), a lane next to the current driving lane, and a lane in which a vehicle travelling in the opposite direction is travelling. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface. The light may be light generated by a lamp provided in the nearby vehicle. The light may be light generated by a street light. The light may be solar light. The road may include a road surface, a curve, and slopes, such as an upward slope and a downward slope. The structure may be a body located around the road in the state of being fixed onto the ground. For example, the structure may include a streetlight, a roadside tree, a building, a traffic light, and a bridge. The geographical feature may include a mountain and a hill.

Meanwhile, the object may be classified as a movable object or a stationary object. For example, the movable object may include a nearby vehicle and a pedestrian. For example, the stationary object may include a traffic signal, a road, and a structure.

The object detection device 300 may include a camera 310, a radar 320, a lidar 330, an ultrasonic sensor 340, an infrared sensor 350, and a processor 370. Each component of the object detection device 300 may be separated from or integrated with the sensing unit 120, structurally or operatively.

In some embodiments, the object detection device 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310*a*, an Around View Monitoring (AVM) camera 310*b*, or a 360-degree camera.

Using various image processing algorithms, the camera 310 may acquire location information of an object, information on distance to the object, and information on speed relative to the object.

For example, based on change in size over time of an object in acquired images, the camera 310 may acquire information on distance to the object and information on speed relative to the object.

For example, the camera 310 may acquire the information on distance to the object and the information on speed relative to the object by utilizing a pin hole model or by profiling a road surface.

For example, the camera 310 may acquire the information on distance to the object and the information on the speed relative to the object, based on information on disparity of stereo images acquired by a stereo camera 310*a*.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar. When implemented as the drive type lidar, the lidar 300 may rotate by a motor and detect an object in the vicinity of the vehicle 100. When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object. The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object. The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object. The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection device 300. The processor 370 may detect or classify an object by comparing data sensed by the camera 310, the radar 320, the lidar 330, the ultrasonic sensor 340, and the infrared sensor 350 with pre-stored data.

The processor 370 may detect and track an object based on acquired images. The processor 370 may, for example, calculate the distance to the object and the speed relative to the object.

For example, the processor 370 may acquire information on the distance to the object and information on the speed relative to the object based on a variation in size over time of the object in acquired images.

In another example, the processor 370 may acquire information on the distance to the object or information on the speed relative to the object by employing a pin hole model or by profiling a road surface.

In yet another example, the processor 370 may acquire information on the distance to the object and information on the speed relative to the object based on information on disparity of stereo images acquired from the stereo camera 310*a*.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

As described before, once the vehicle 100 starts the learning mode in response to a user input to the input unit 210, the processor 370 may store data sensed by the camera 310, the radar 320, the lidar 330, the ultrasonic sensor 340, and the infrared sensor 350 in the memory 140.

Each step of the learning mode based on analysis of stored data, and an operating mode following the learning mode will be described later in detail in relation to the operation system 700. According to an embodiment, the object detection device 300 may include a plurality of processors 370 or no processor 370. For example, the camera 310, the radar 320, the lidar 330, the ultrasonic sensor 340, and the infrared sensor 350 may include individual processors.

In a case where the object detection device 300 does not include the processor 370, the object detection device 300 may operate under control of the controller 170 or a processor inside the vehicle 100. The object detection device 300 may operate under control of the controller 170.

The communication device 400 is configured to perform communication with an external device. Here, the external device may be a nearby vehicle, a mobile terminal, or a server. To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470. In some embodiments, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus). The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal. In some embodiments, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 may control the overall operation of each unit of the communication device 400. In some embodiments, the communication device 400 may include a plurality of processors 470, or may not include the processor 470. In a case where the communication device 400 does not include the processor 470, the communication device 400 may operate under control of the controller 170 or a processor of a device inside of the vehicle 100.

Meanwhile, the communication device 400 may implement a vehicle display device, together with the user interface device 200. In this case, the vehicle display device may be referred to as a telematics device or an Audio Video Navigation (AVN) device. The communication device 400 may operate under control of the controller 170.

The maneuvering device 500 is configured to receive a user input for driving the vehicle 100. In the manual mode, the vehicle 100 may operate based on a signal provided by the maneuvering device 500. The maneuvering device 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some embodiments, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some embodiments, the acceleration input device or the break input device may be configured as a touch screen, a touch pad, or a button.

The maneuvering device 500 may operate under control of the controller 170.

The vehicle drive device 600 is configured to electrically control the operation of various devices of the vehicle 100. The vehicle drive device 600 may include a power train drive unit 610, a chassis drive unit 620, a door/window drive unit 630, a safety apparatus drive unit 640, a lamp drive unit 650, and an air conditioner drive unit 660. In some embodiments, the vehicle drive device 600 may further include other components in addition to the aforementioned components, or may not include some of the aforementioned components. Meanwhile, the vehicle drive device 600 may include a processor. Each unit of the vehicle drive device 600 may include its own processor.

The power train drive unit 610 may control the operation of a power train. The power train drive unit 610 may include a power source drive unit 611 and a transmission drive unit 612.

The power source drive unit 611 may control a power source of the vehicle 100. In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power source drive unit 610 may control, for example, the RPM and toque of the motor under control of the controller 170.

The transmission drive unit 612 may control a transmission. The transmission drive unit 612 may adjust the state of the transmission. The transmission drive unit 612 may adjust a state of the transmission to a drive (D), reverse (R), neutral (N), or park (P) state. Meanwhile, in a case where an engine is the power source, the transmission drive unit 612 may adjust a gear-engaged state to the drive position D.

The chassis drive unit 620 may control the operation of a chassis. The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

Meanwhile, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100. Meanwhile, the suspension drive unit 623 may control a plurality of suspensions individually.

The door/window drive unit 630 may perform electronic control of a door apparatus or a window apparatus inside the vehicle 100. The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100. The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle dive device 600 may include its own processor. The vehicle drive device 600 may operate under control of the controller 170.

The operation system 700 is a system for controlling the overall driving operation of the vehicle 100. The operation system 700 may operate in the autonomous driving mode.

The operation system 700 may include the driving system 710, the vehicle pulling-out system 740, and the vehicle parking system 750. In some embodiments, the operation system 700 may further include other components in addition to the aforementioned components, or may not include some of the aforementioned component. Meanwhile, the operation system 700 may include a processor. Each unit of the operation system 700 may include its own processor.

Meanwhile, the operation system 700 may control driving in the autonomous mode based on learning. In this case, the learning mode and an operating mode based on the premise of completion of learning may be performed. A description will be given below of a method of executing the learning mode and the operating mode by the processor of the operation system 700.

The learning mode may be performed in the aforedescribed manual mode. In the learning mode, the processor of the operation system 700 may learn a driving route and ambient environment of the vehicle 100.

The learning of the driving route may include generating map data for a route in which the vehicle 100 drives. Particularly, the processor of the operation system 700 may generate map data based on information detected through the object detection device 300 during driving from a departure to a destination.

The learning of the ambient environment may include storing and analyzing information about an ambient environment of the vehicle 100 during driving and parking. Particularly, the processor of the operation system 700 may store and analyze the information about the ambient environment of the vehicle based on information detected through the object detection device 300 during parking of the vehicle 100, for example, information about a location, size, and a fixed (or mobile) obstacle of a parking space.

The operating mode may be performed in the aforedescribed autonomous mode. The operating mode will be described based on the premise that the driving route or the ambient environment has been learned in the learning mode.

The operating mode may be performed in response to a user input through the input unit 210, or when the vehicle 100 reaches the learned driving route and parking space, the operating mode may be performed automatically.

The operating mode may include a semi-autonomous operating mode requiring some user's manipulations of the maneuvering device 500, and a full autonomous operating mode requiring no user's manipulation of the maneuvering device 500.

According to an embodiment, the processor of the operation system 700 may drive the vehicle 100 along the learned driving route by controlling the operation system 710 in the operating mode.

According to an embodiment, the processor of the operation system 700 may pull out the vehicle 100 from the learned parking space by controlling the vehicle pulling-out system 740 in the operating mode.

According to an embodiment, the processor of the operation system 700 may park the vehicle 100 in the learned parking space by controlling the vehicle parking system 750 in the operating mode. Meanwhile, in some embodiments, in a case where the operation system 700 is implemented as software, the operation system 700 may be a subordinate concept of the controller 170.

Meanwhile, in some embodiments, the operation system 700 may be a concept including at least one selected from among the user interface device 200, the object detection device 300, the communication device 400, the vehicle drive device 600, and the controller 170.

The driving system 710 may perform driving of the vehicle 100. The driving system 710 may perform driving of the vehicle 100 by providing a control signal to the vehicle drive device 600 in response to reception of navigation information from the navigation system 770.

The driving system 710 may perform driving of the vehicle 100 by providing a control signal to the vehicle drive device 600 in response to reception of object information from the object detection device 300. The driving system 710 may perform driving of the vehicle 100 by providing a control signal to the vehicle drive device 600 in response to reception of a signal from an external device through the communication device 400.

Conceptually, the driving system 710 may be a system that drives the vehicle 100, including at least one of the user interface device 200, the object detection device 300, the communication device 400, the maneuvering device 500, the vehicle drive device 600, the navigation system 770, the sensing unit 120, or the controller 170. The driving system 710 may be referred to as a vehicle driving control device.

The vehicle pulling-out system 740 may perform an operation of pulling the vehicle 100 out of a parking space. The vehicle pulling-out system 740 may perform an operation of pulling the vehicle 100 out of a parking space, by providing a control signal to the vehicle drive device 600 in response to reception of navigation information from the navigation system 770.

The vehicle pulling-out system 740 may perform an operation of pulling the vehicle 100 out of a parking space, by providing a control signal to the vehicle drive device 600 in response to reception of object information from the object detection device 300.

The vehicle pulling-out system 740 may perform an operation of pulling the vehicle 100 out of a parking space, by providing a control signal to the vehicle drive device 600 in response to reception of a signal from an external device.

Conceptually, the vehicle pulling-out system 740 may be a system that performs pulling-out of the vehicle 100, including at least one of the user interface device 200, the object detection device 300, the communication device 400, the maneuvering device 500, the vehicle drive device 600, the navigation system 770, the sensing unit 120, or the controller 170.

The vehicle pulling-out system 740 may be referred to as a vehicle pulling-out control device.

The vehicle parking system 750 may perform an operation of parking the vehicle 100 in a parking space. The vehicle parking system 750 may perform an operation of parking the vehicle 100 in a parking space, by providing a control signal to the vehicle drive device 600 in response to reception of navigation information from the navigation system 770.

The vehicle parking system 750 may perform an operation of parking the vehicle 100 in a parking space, by providing a control signal to the vehicle drive device 600 in response to reception of object information from the object detection device 300.

The vehicle parking system 750 may perform an operation of parking the vehicle 100 in a parking space, by providing a control signal to the vehicle drive device 600 in response to reception of a signal from an external device.

Conceptually, the vehicle parking system 750 may be a system that performs parking of the vehicle 100, including at least one of the user interface device 200, the object detection device 300, the communication device 400, the maneuvering device 500, the vehicle drive device 600, the navigation system 770, the sensing unit 120, or the controller 170.

The vehicle parking system 750 may be referred to as a vehicle parking control device.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some embodiments, the navigation system 770 may update pre-stored information by receiving information from an external device through the communication device 400. In some embodiments, the navigation system 770 may be classified as an element of the user interface device 200.

Figure 8:
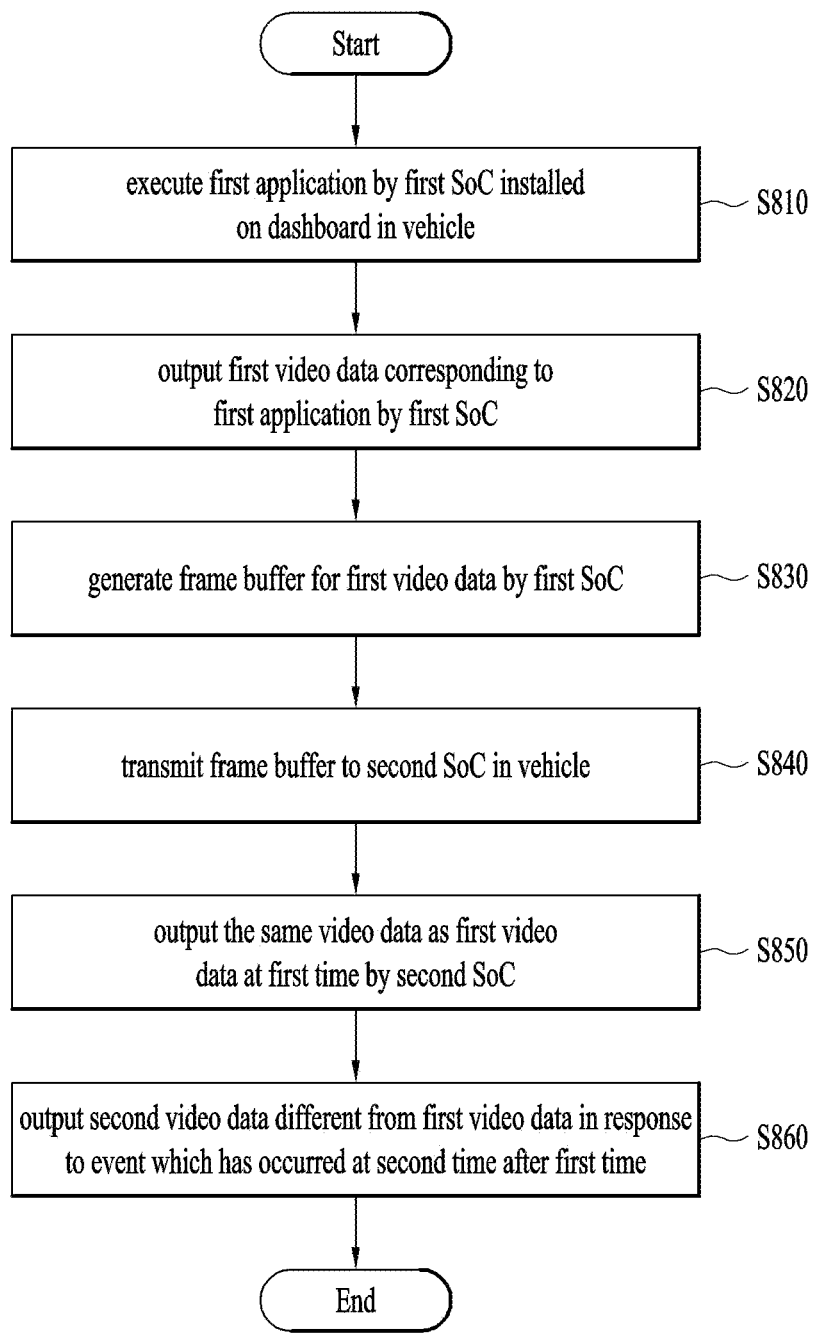
FIG. 8 is a flowchart illustrating an overall method of controlling a plurality of system-on-chips (SoCs) in a vehicle according to an aspect of the present disclosure.

FIG. 8 is a flowchart illustrating an overall method of controlling a plurality of system-on-chips (SoCs) in a vehicle according to an aspect of the present disclosure. Supplementary interpretation of FIGS. 8 to 18 to be described later with reference to FIGS. 1 to 7 also falls within the scope of the present disclosure.

According to an embodiment of the present disclosure, a first SoC installed on a dashboard in a vehicle executes a first application (S810). The first SoC outputs first video data corresponding to the first application (S820).

The first SoC generates a frame buffer for the first video data (S830) and transmits the frame buffer to a second SoC installed on the back of a front seat in the vehicle (S840). The first SoC corresponds to, for example, a central information display (CID) or a module or chip that controls the CID, whereas the second SoC corresponds to, for example, a rear seat entertainment (RSE) or a module or chip that controls the RSE.

The second SoC outputs the same video data as the first video data at a first time (S850) and outputs second video data different from the first video data in response to occurrence of an event at a second time after the first time (S860). Therefore, compared to the conventional simple mirroring method, this method is advanced in that the CID and the RSE of the vehicle switch to different screens according to a specific trigger condition (e.g., a touch input) during providing of the same screen.

Further, the first SoC still transmits the first video data to the second SoC until before the event (e.g., touch input) occurs.

The second SoC executes a second application identical to or corresponding to the first application in response to the event. For this purpose, the first SoC generates the frame buffer for the first video data and transmits the frame buffer to the second SoC until before the occurrence of the event.

After the event occurs, the first SoC discontinues the generation of the frame buffer for the first video data, to thereby reduce resource consumption for generation of an unnecessary frame buffer.

Only in response to a specific first type of event that has occurred at a third time after the second time, the second SoC transmits a command related to the specific first type of event to the first SoC. Only in response to a specific second type of event that has occurred at a fourth time after the third time, the second SoC discontinues the execution of the second application and resumes reception of the first video data from the first SoC. This operation will be described later in greater detail with reference to FIGS. 11 to 14.

Figure 9:
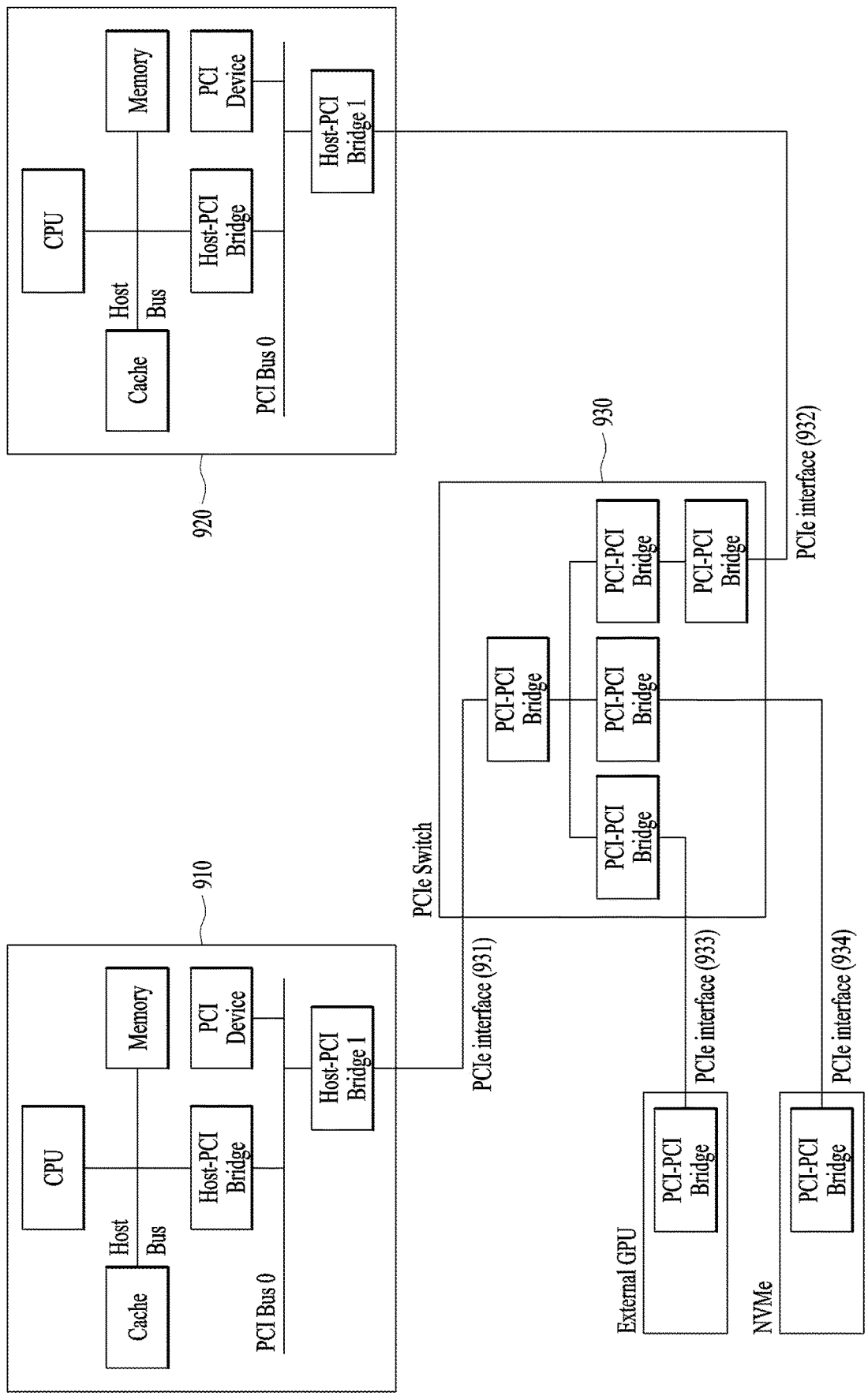
FIG. 9 is a detailed diagram illustrating the configuration of a cockpit domain controller (CDC) system based on peripheral component interconnect express (PCIe) interconnection in a scenario of distributing workload between SoCs according to an aspect of the present disclosure.

With reference to FIG. 9, a solution for distributing workload between the plurality of SoCs described with reference to FIG. 8 will be described below.

FIG. 9 is a detailed block diagram illustrating the configuration of a cockpit domain controller (CDC) system based on peripheral component interconnect express (PCIe) interconnection in a scenario of distributing workload between SoCs according to an aspect of the present disclosure.

A CDC system according to an aspect of the present disclosure may include a plurality of SoCs 910 and 920, an external graphics processing unit (GPU) 940, a non-volatile memory express (NVMe) 950, and a field-programmable gate array (FPGA) device (not shown), which communicate with a PCIe switch 930 via PCIe interfaces 931, 932, 933, and 934, respectively.

Each of the SoCs 910 and 920 may control a plurality of displays and include a central processing unit (CPU), a cache, a memory, a host-PCI bridge, and a PCI device. While not shown, one or more components may be omitted in or added to the above components in each of the SoCs 910 and 920.

The PCI switch 930 may include a plurality of PCI-PCI bridges and may be connected to the SOCs 910 and 920, the external GPU 940, and the NVMe 950 via the plurality of PCIe interfaces 931, 932, 933, and 934, respectively. According to an aspect of the present disclosure, the plurality of PCIe interfaces 931, 932, 933, and 934 may be, but not limited to, wired interfaces.

The CDC system of the present disclosure may achieve new features such as increased computing performance or storage expansion. Further, a performance per grade requirement may be satisfied by attaching each device via a PCIe interface. For example, when GPU performance is to be increased, the performance requirement may be satisfied by upgrading an SoC or adding a GPU.

Further, the SoCs illustrated in FIG. 9 may be used to control the CID and the RSE described herein, respectively.

Figure 10:
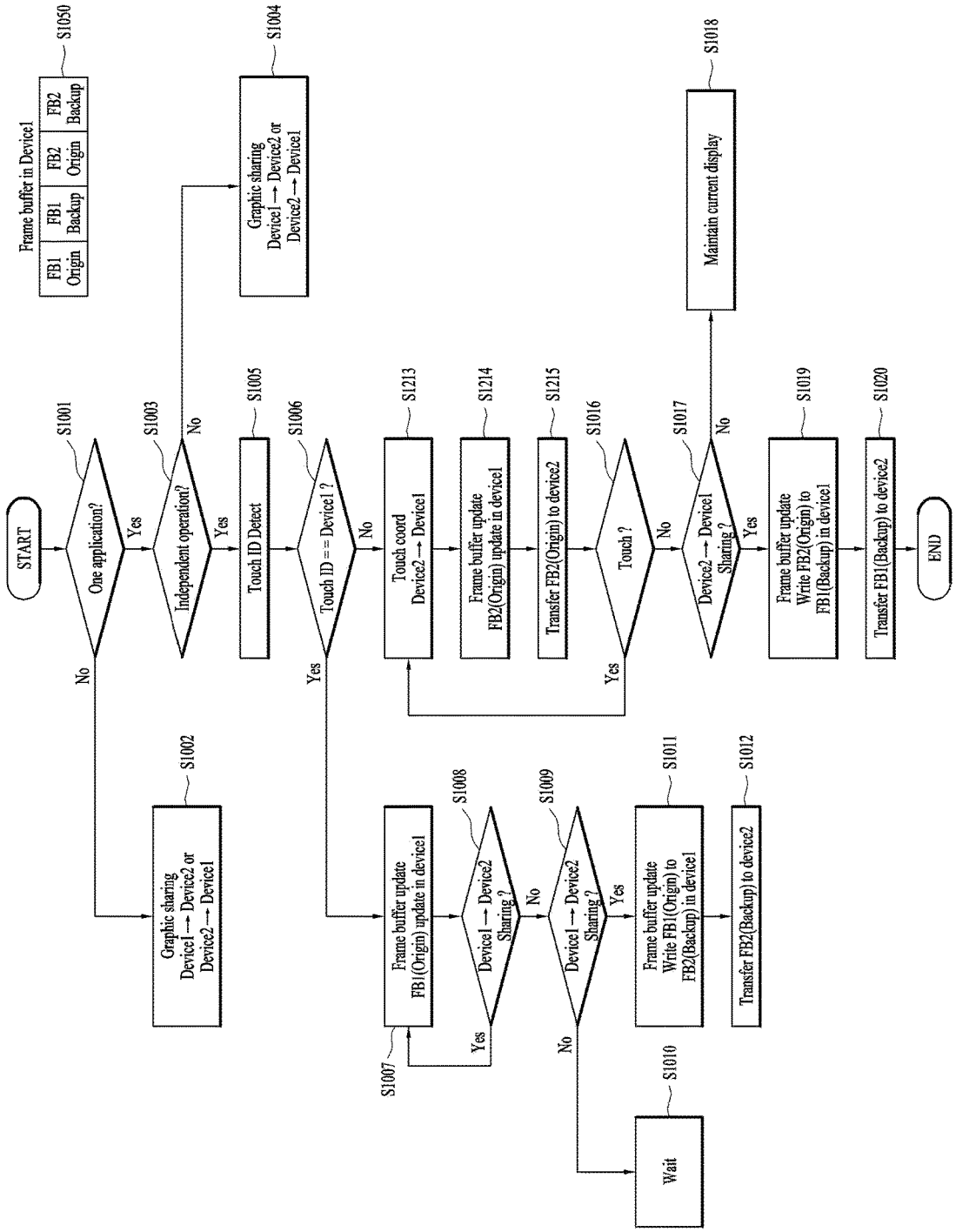
FIG. 10 is a detailed flowchart illustrating a process of updating frame buffers by a plurality of SoCs in a vehicle according to an aspect of the present disclosure.

FIG. 10 is a detailed flowchart illustrating a process of updating frame buffers by a plurality of SoCs in a vehicle according to an aspect of the present disclosure.

First, it is determined whether the same single application is running on the first SoC and the second SoC (S1001). When it is determined that the same single application is not running, a graphic sharing operation is performed (S1002). That is, a screen executed on the first SoC is transmitted to the second SoC or a screen executed on the second SoC is transmitted to the first SoC.

On the contrary, when it is determined that the same single application is running, it is determined whether the application is under individual control (S1003). When it is determined that the application is not under individual control, the graphic sharing operation is performed (S1004). That is, the screen executed on the first SoC is transmitted to the second SoC or the screen executed on the second SoC is transmitted to the first SoC.

When it is determined that the application is under individual control, a touch input is received and detected (S1005), and it is determined whether the touch input has occurred in the first SoC (S1006). When it is determined that the touch input has occurred in the first SoC, frame buffers S1050 illustrated in FIG. 10 are updated (S1007) and it is determined whether an additional touch has been recognized (S1008).

When it is determined that an additional touch has not been recognized, it is determined whether sharing from the first SoC to the second SoC is needed (S1009). When it is determined that the sharing is not needed, a standby state is maintained (S1010). When it is determined that the sharing is needed, the frame buffers are updated (S1011), and a frame buffer for backup, FB2 (Backup) is transmitted from the first SoC to the second SoC (S1012).

When it is determined that the touch has not been recognized from the first SoC in operation S1006, the second SoC transmits touch-related coordinates to the first SoC (S1013), the frame buffers are updated (S1014), and an original frame buffer FB2 (Original) is transmitted from the first SoC to the second SoC (S1015).

Further, it is determined whether an additional touch has been recognized (S1016). When it is determined that an additional touch has not been recognized, it is determined whether sharing from the second SoC to the first SoC is needed (S1017). When it is determined that the sharing is not needed, a current screen is maintained (S1018). When it is determined that the sharing is needed, the frame buffers are updated (S1019), and a frame buffer for backup, FB1 (Backup) is transmitted from the first SoC to the second SoC (S1020).

That is, the present disclosure may be summarized as follows based on FIG. 10 and other drawings. When an application running in the first SoC is transmitted to another display (e.g., the second SoC), the second SoC may receive application information and execute the application separately.

From the time of receiving the application information, the second SoC executes the application separately from the first SoC. As a condition for the individual application execution, the present disclosure proposes that when the CID (first SoC) transmits an application, the individual application execution is selected, or the individual application execution is automatically performed according to the type of an application received at the RSE (or the second SoC) or upon recognition of a touch input on the RSE.

Further, transmission of an input result of the second SoC to the first SoC and output of only the input result of the second SoC or a corresponding screen on the first SoC according to the result value of an input (e.g., a specific touch) to the second SoC may fall within the scope of the present disclosure.

According to another embodiment of the present disclosure, it is determined whether the application transmitted from the first SoC allows reception of a touch input on the second SoC (RSE).

When the type of the application does not allow reception of a touch input on the second SoC (RSE), a screen executed on the first SoC is mirrored to the second SoC.

On the contrary, when the type of the application allows reception of a touch input on the second SoC (RSE), frame buffers are divided for backup, and a backup frame buffer is output on the second SoC (RSE). The second SoC (RSE) combines the backup frame buffer with a user interface (UI) for RSE (e.g., point of interest (POI)) and outputs the combination.

For the UI for RSE, a frame buffer may be configured and output separately. Providing the UI for RSE (partial mirroring) on the second SoC also falls within the scope of the present disclosure. A more specific embodiment will be described below with reference to FIGS. 11 to 14.

Figure 11:
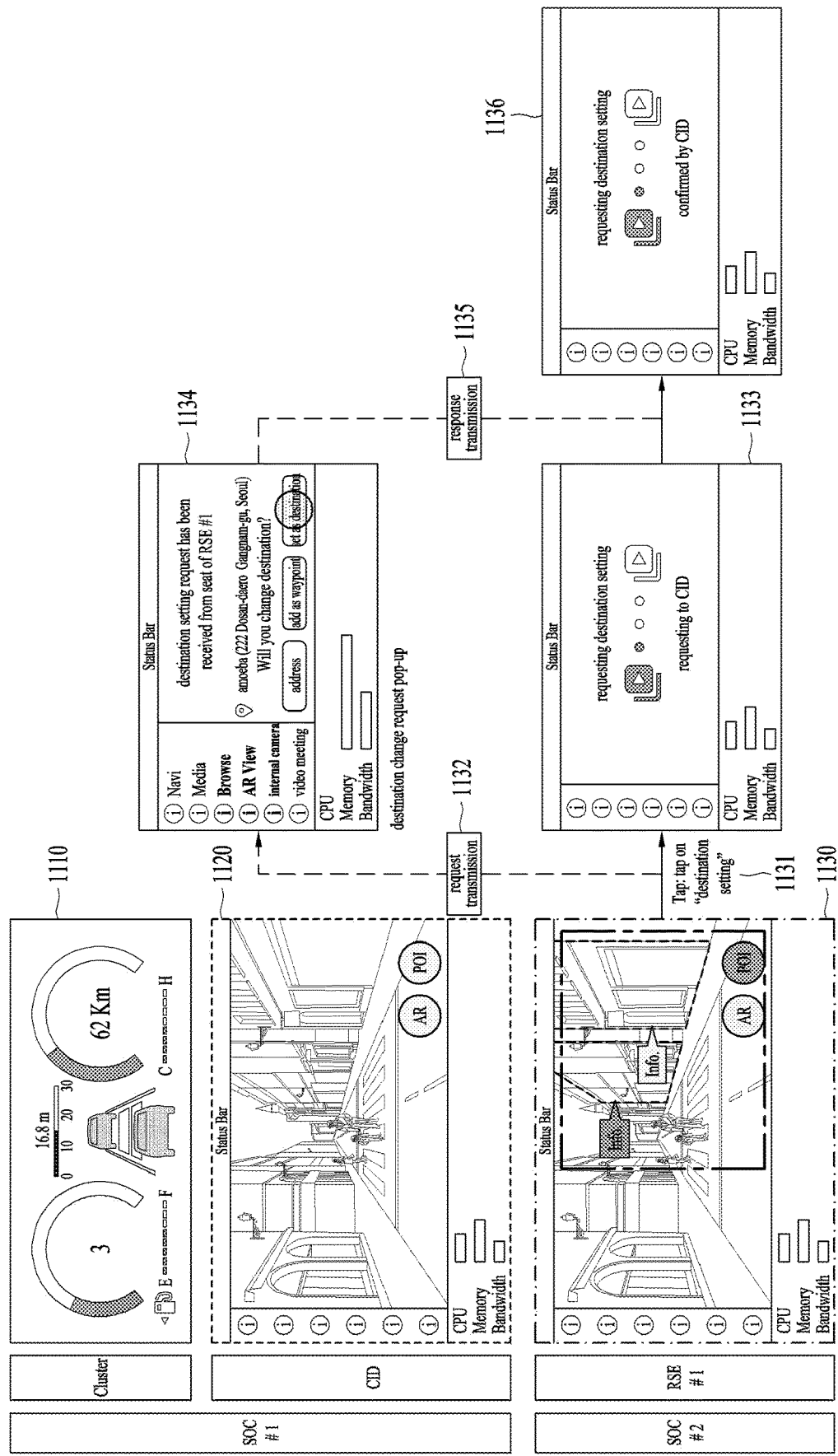
FIG. 11 is a flowchart illustrating a process of generating and outputting frame buffers for a central information display (CID) and a rear seat entertainment (RSE) by a first system-on-chip (SoC) according to an aspect of the present disclosure.

FIG. 11 is a flowchart illustrating a process of generating and outputting frame buffers for a CID and an RSE by a first SoC according to an aspect of the present disclosure. FIG. 12 is a detailed diagram illustrating the frame buffers used in FIG. 11.

In summary of FIG. 11, the type of an application transmitted from the first SoC to the second SoC allows reception of a touch input on the second SoC. Herein, the first SoC generates and outputs frame buffers for the CID (first SoC) and the RSE (second SoC), respectively.

That is, frame buffers are divided for backup, and a backup screen is output to the RSE (second SoC). Further, the first SoC configures and outputs screens for both the CID and the RSE, and partial mirroring is performed separately for an RSE-dedicated output UI (e.g., POI) through one of the first SoC and the second SoC. The coordinates of a touch input to the second SoC (RSE) are transmitted to the first SoC.

For example, as illustrated in FIG. 11, the first SoC, SOC #1 manages a cluster and the CID, and the second SoC, SOC #2 manages the RSE. The cluster displays basic information 1110 such as a driving speed, a travelled distance, and a fuel level. The CID displays an application (e.g., navigation) 1120, and the RSE also displays the same screen 1130 as that of the CID.

Compared to the prior art, when a touch 1131 on "destination setting" is recognized, the second SoC (RSE) transmits a related request signal to the first SoC that manages the CID (1132) in the above mirroring situation according to an embodiment of the present disclosure.

Compared to the prior art, despite the mirroring situation, the RSE displays a message 1133 indicating that the destination setting is being requested to the CID, and the CID displays a message 1134 indicating that the destination setting request has been received. In addition, upon receipt of a response signal 1135 from the first SoC, the second SoC displays a confirm message 1136. Accordingly, because a driver close to the CID does not need to directly set a destination during navigation, a processing speed and driving stability may be increased.

Meanwhile, an embodiment of configuring frame buffers for implementing the process illustrated in FIG. 11 are illustrated in FIG. 12. As illustrated in FIG. 12, general frame buffers for the CID and the RSE are all generated in the first SoC, whereas a frame buffer for partial mirroring (e.g., POI) is generated in the first SoC or the second SoC. The partial mirroring implies that only a partial screen of a connected device is output in a first area, and a screen unique to the device is output in a different second area.

Figure 13:
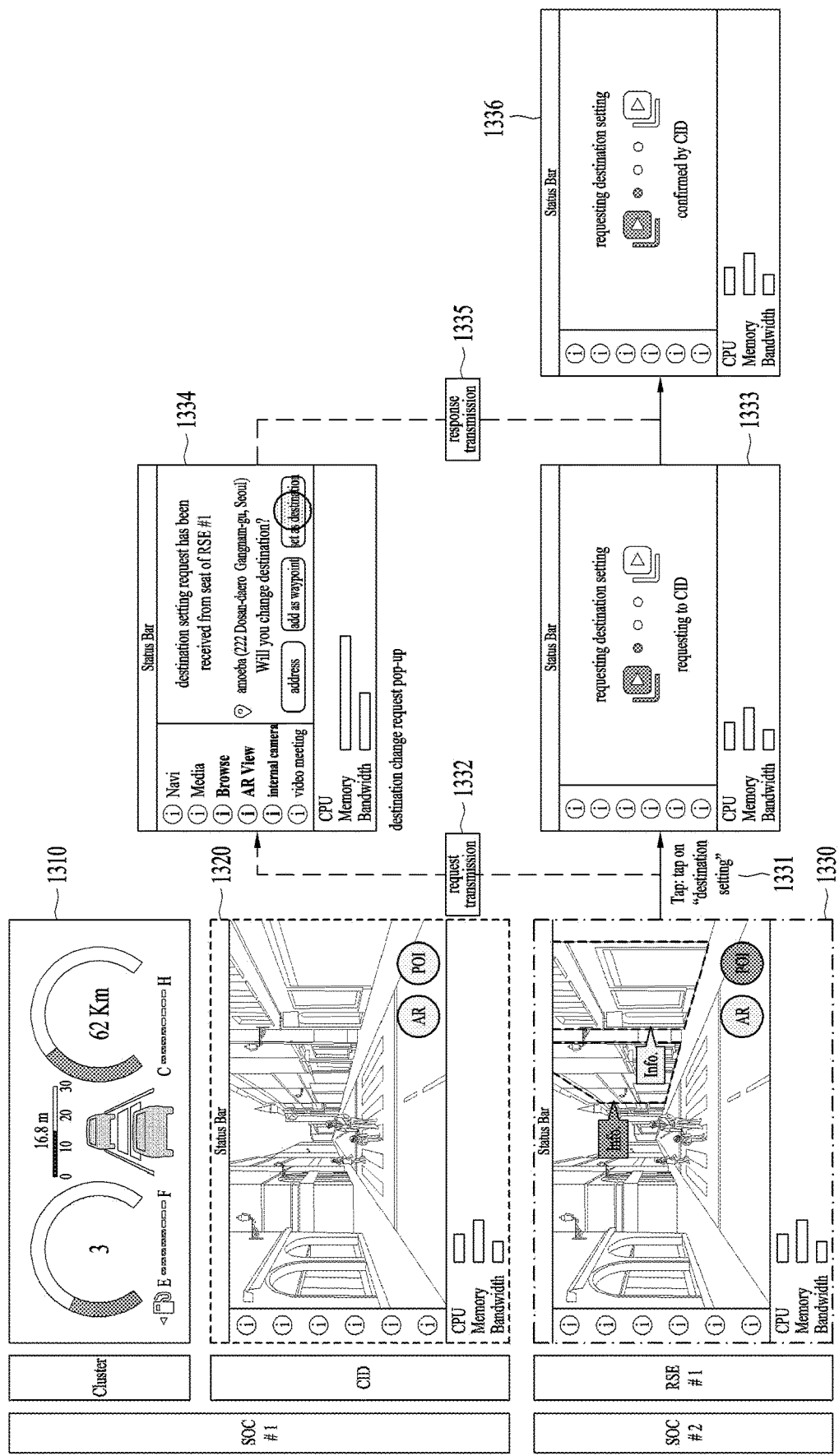
FIG. 13 is a flowchart illustrating a process of driving a first SoC and a second SoC individually.
Figure 14:
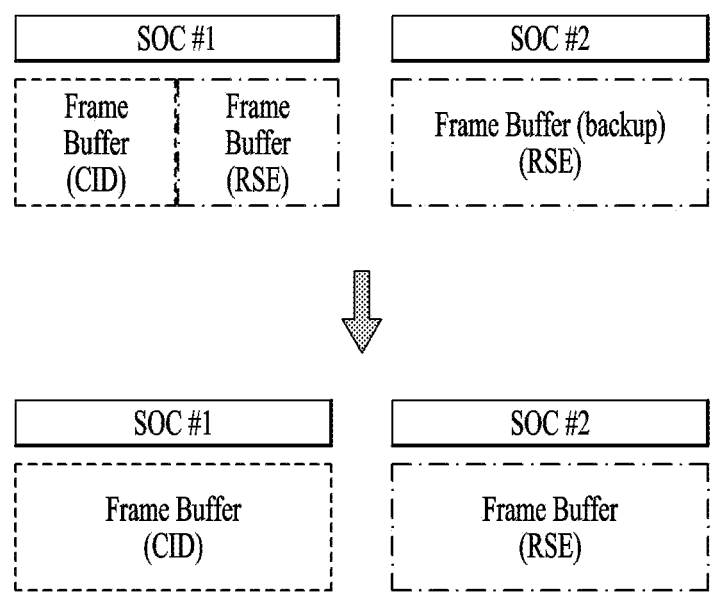
FIG. 14 is a detailed diagram illustrating frame buffers used in FIG. 13.

FIG. 13 is a flowchart illustrating a process of driving the first SoC and the second SoC individually. FIG. 14 is a detailed diagram illustrating frame buffers used in FIG. 13.

In summary of FIG. 13, the type of an application transmitted from the first SoC to the second SoC allows reception of a touch input on the second SoC. However, unlike FIG. 13, when a touch is input, the same application is separately executed on the first SoC and the second SoC.

For this purpose, an application running on the first SoC is simultaneously executed in the background on the second SoC. The RSE (second SoC) outputs the application that has been executed in the background from a time when a touch input is detected on the RSE (second SoC) (that is, the same application is individually executed in each SoC). More specifically, for example, when information is transmitted from the RSE to the CID (e.g., a destination is transferred during navigation), the input result of the second SoC is transmitted to the first SoC.

More specifically, for example, as illustrated in FIG. 13, the first SoC, SOC #1 manages the cluster and the CID, and the second SoC, SOC #2 manages the RSE. The cluster displays basic information 1310 such as a driving speed, a travelled distance, and a fuel level. The CID displays an application (e.g., navigation) 1320, and the RSE also displays the same screen 1330 as that of the CID.

Compared to the prior art, when a touch 1331 on "destination setting" is recognized, the second SoC (RSE) transmits a related request signal to the first SoC that manages the CID (1332) in the above mirroring situation according to an embodiment of the present disclosure.

Compared to the prior art, despite the mirroring situation, the RSE displays a message 1333 indicating that the destination setting is being requested to the CID, and the CID displays a message 1334 indicating that the destination setting request has been received. In addition, upon receipt of a response signal 1335 from the first SoC, the second SoC displays a confirm message 1336. Accordingly, because the driver close to the CID does not need to directly set a destination during navigation, a processing speed and driving stability may be increased.

Although in this respect, the embodiment of FIG. 13 appears to be similar to the embodiment of FIG. 11, the RSE uses different frame buffers before and after the touch detection in the embodiment of FIG. 13. For example, as illustrated in FIG. 14, before a touch is detected in the RSE, general frame buffers for the CID and the RSE are all generated in the first SoC, whereas only a frame buffer for backup is generated in the second SoC. However, after the touch is detected in the RSE, only the frame buffer for CID is used in the first SoC, and only the frame buffer for RSE is used in the second SoC, thereby enabling individual operation management.

Figure 15:
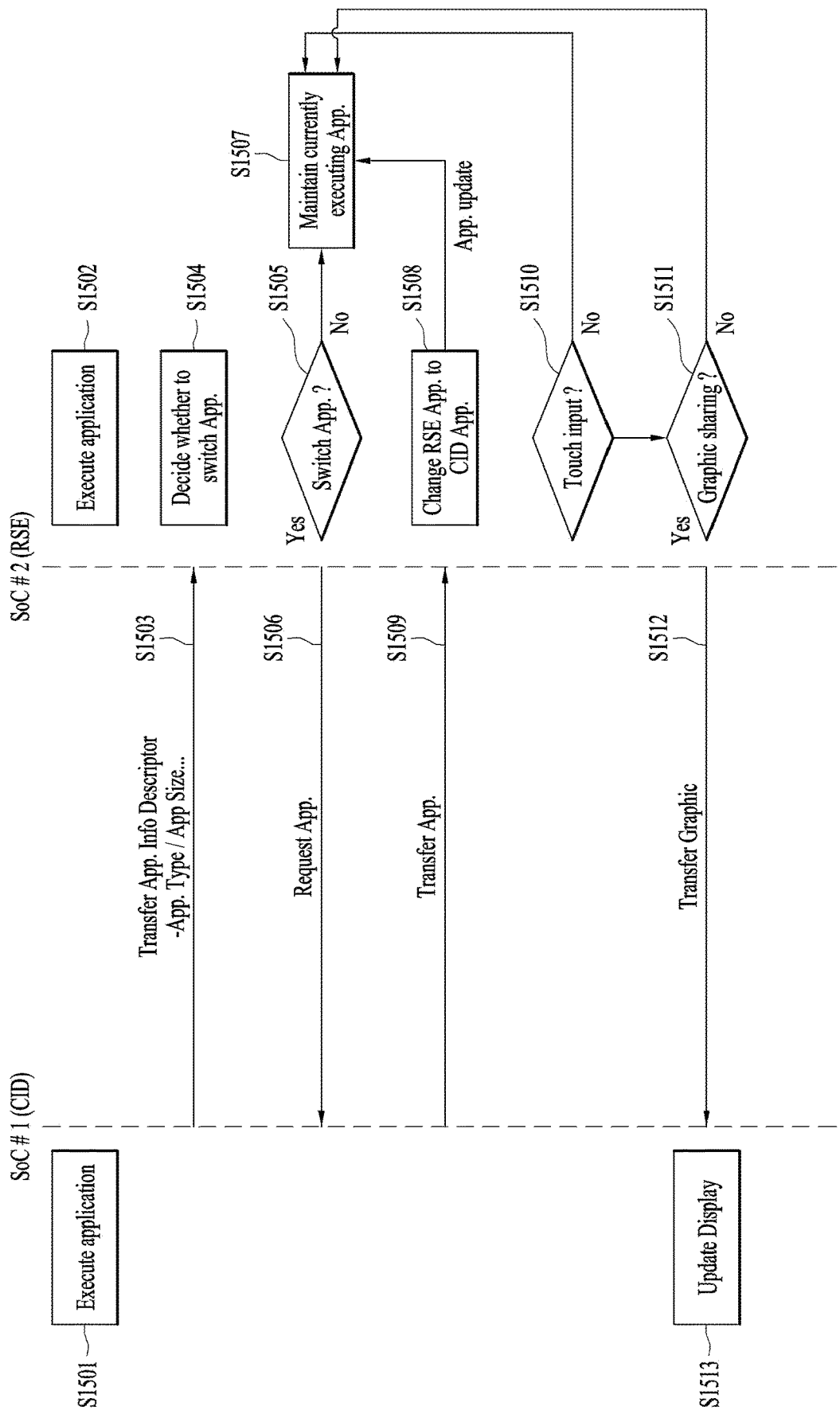
FIG. 15 is a flowchart illustrating a process of individually executing the same application in a CID and an RSE.

FIG. 15 is a flowchart illustrating a process of individually executing the same application on a CID and an RSE.

In summary of FIG. 15, in a process of individually executing the same application on the CID and the RSE, the second SoC (RSE) receives various pieces of information (metadata and so on) of the application from the first SoC (CID) and determines whether to receive the application based on the received information. When the second SoC receives the application from the first SoC, the RSE is updated to the received application. Then, it becomes possible for the first SoC and the second SoC to separately execute the same application.

For example, as illustrated in FIG. 15, the first SoC (CID) executes an application (S1501). It is assumed herein that the second SoC (RSE) is executing another application (S1502).

The first SoC transmits various pieces of information (e.g., an app type, an app size, and so on) related to the application to the second SoC (S1503), and the second SoC determines whether to switch to the application running on the first SoC (S1504). When determining not to switch to the application (S1505), the second SoC maintains the current running application (S1507).

On the contrary, when determining to switch to the application (S1505), the second SoC transmits an application request signal to the first SoC (S1506). In response, the first SoC transmits the application to the second SoC (S1509). In response, the second SoC switches the current running RSE application to the CID application (S1508).

The second SoC determines whether a touch input has been received (S1510). Upon receipt of a touch input, the second SoC determines whether to perform graphic sharing (S1511). When selecting graphic sharing, the second SoC transmits corresponding graphic data to the first SoC (S1512), and the first SoC displays the graphic data (S1513).

Figure 16:
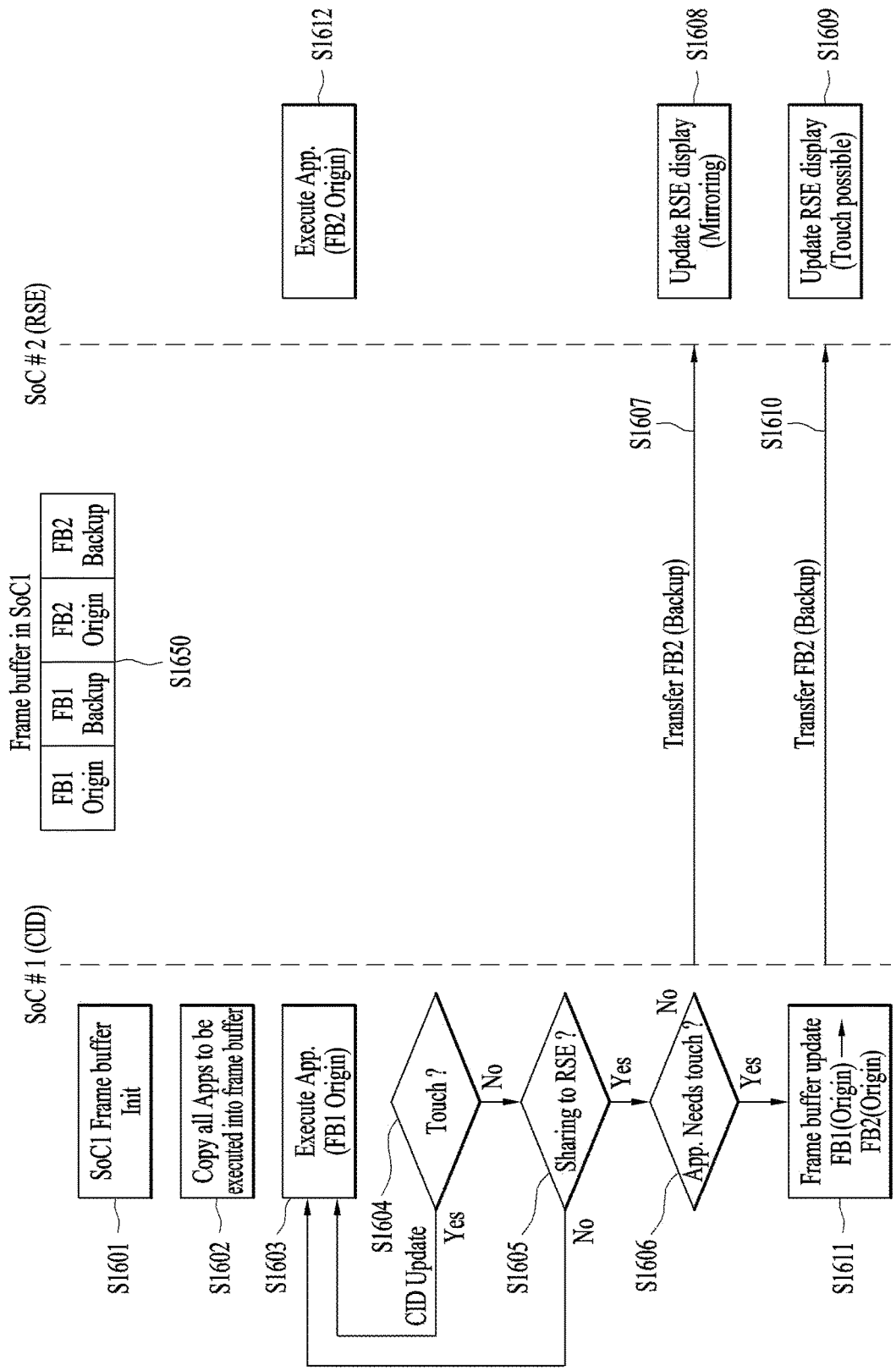
FIG. 16 is a detailed flowchart illustrating a process performed when a touch event occurs on a CID.

FIG. 16 is a detailed flowchart illustrating a process which is performed upon occurrence of a touch event in a CID.

In summary of FIG. 16, after the same application is copied to reduce memory resource consumption, the CID and the RSE are separately controlled in response to a touch. For this purpose, after all frame buffers to be controlled by the first SoC are initialized, the same application to be executed is copied to the frame buffers. Among frame buffers S1650 illustrated in FIG. 16, FB1 (Origin) and FB2 (Origin) are buffers for individually executing the same application, and FB1 (Backup) and FB2 (Backup) are buffers for sharing the content of FB1 (Origin) and FB2 (Origin), respectively.

When a touch is detected in the first SoC, the CID is updated. When the update is to be shared, the content of FB1 (Origin) is updated to the frame buffer FB2 (Backup), and then FB2 (Backup) is transmitted to the RSE.

For example, as illustrated in FIG. 16, the first SoC initializes frame buffers (S1601). Then, the first SoC copies all applications to be executed to the frame buffers (S1602).

During execution of an application (S1603), the first SoC determines whether a touch has been detected (S1604). When a touch has been detected, the first SoC updates the CID, and when a touch has not been detected, the first SoC determines whether to perform sharing with the RSE (second SoC) (S1605).

When determining to perform sharing, the first SoC determines whether the current running application is an application requiring a touch (S1606). When the application does not require a touch, the first SoC transmits FB2 (Backup) of frame buffers S1650 to the second SoC, and the second SoC displays a simple mirroring screen (S1608). On the contrary, when the application requires a touch, the first SoC updates the frame buffers (S1611). The first SoC transmits FB2 (Backup) among the frame buffers S1650 to the second SoC, and the second SoC outputs an individual application, instead of the simple mirroring screen (S1609). In this manner, individual control is possible.

Figure 17:
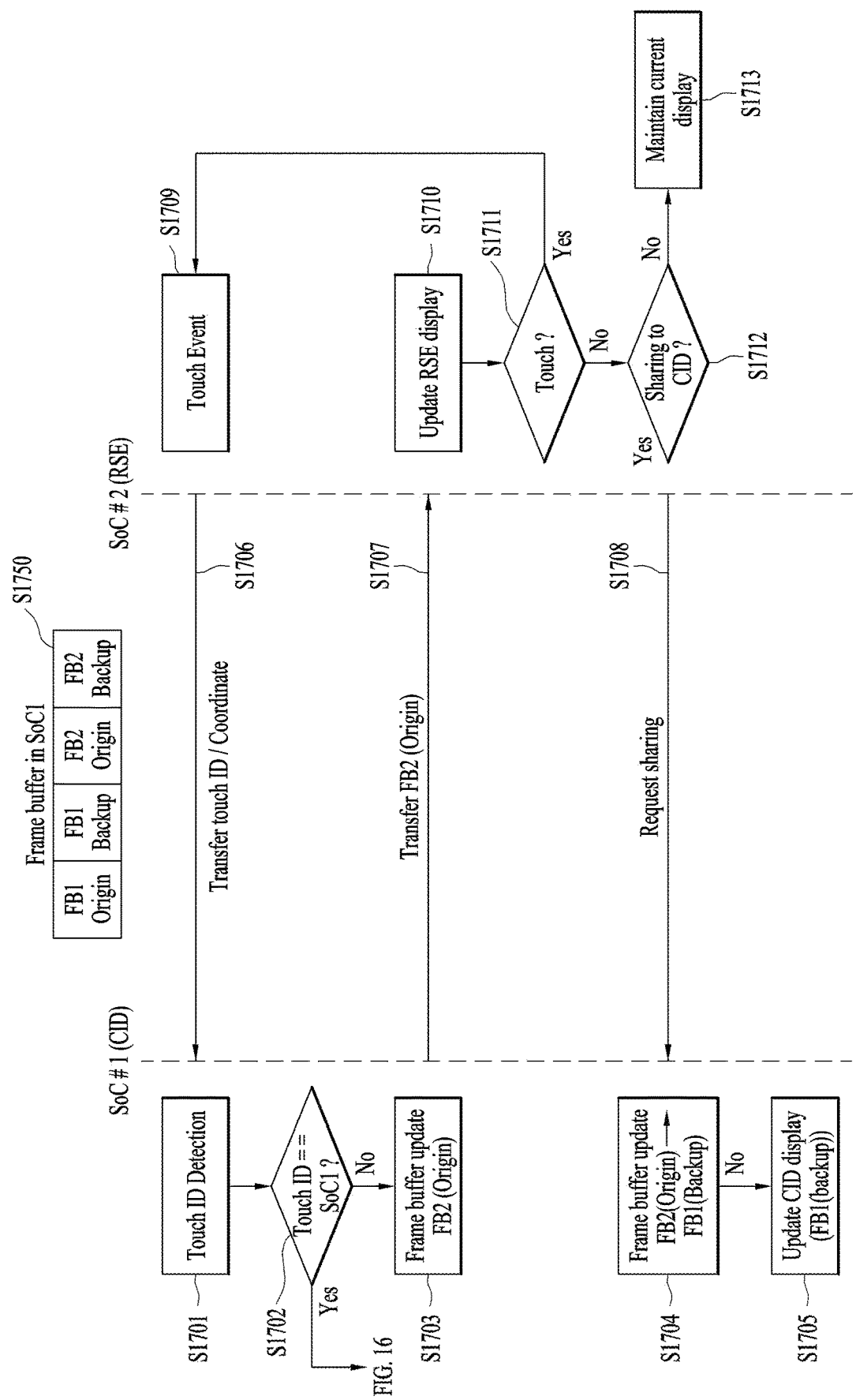
FIG. 17 is a detailed flowchart illustrating a process which is performed when a touch event occurs on an RSE.

FIG. 17 is a detailed flowchart illustrating a process which is performed when a touch event occurs on an RSE. FIG. 16 is an embodiment based on the assumption that a touch has been detected in the first SoC (CID), while FIG. 17 is an embodiment based on the assumption that a touch has been detected in the second SoC (RSE).

In FIG. 17, after the same application is copied to frame buffers in order to reduce consumption of memory resources, the CID and the RSE are separately controlled in response to a touch. For this purpose, the first SoC receives a touch identifier (ID) and coordinates generated from the second SoC. The first SoC determines whether the received touch has occurred in the first SoC or the second SoC based on the ID. When the touch has occurred in the first SoC, the first SoC updates the CID. When the touch has occurred in the second SoC, the first SoC updates the buffer FB2 (Origin) and then transmits the updated buffer FB2 (Origin) to the second SoC to update the RSE. Then, when a touch occurs on the RSE, the above-described process is repeated. Meanwhile, in the case of sharing, the content of FB2 (Origin) is updated in the buffer FB1 (Backup), and then the CID is updated.

For example, as illustrated in FIG. 17, when a touch event is detected in the second SoC (S1709), the second SoC transmits a touch ID and coordinates to the first SoC (S1706). In response, the first SoC detects the touch ID (S1701), and determines whether the touch ID is from the first SoC (S1702). When recognizing that the touch has occurred on the first SoC, the first SoC returns to the flowchart of FIG. 16.

When determining that the touch has not occurred on the first SoC, the first SoC updates the frame buffers and transmits FB2 (Origin) among the frame buffers S1750 illustrated in FIG. 17 to the second SoC (S1707). In response, the second SoC updates the RSE (S1710) and determines again whether a touch event has occurred (S1711).

When determining that a touch has not been detected, the second SoC determines whether to perform sharing with the CID (S1712). When determining not to perform sharing with the CID, the second SoC maintains a current screen (S1713). On the contrary, when determining to perform sharing with the CID, the second SoC transmits a sharing request signal to the first SoC (S1708). In response, the first SoC updates the frame buffers (S1704) and updates the CID (S1705).

FIG. 18 is a flowchart illustrating a process of transmitting an output UI of an RSE to a CID by using a separate frame buffer.

In summary of FIG. 18, a UI for output on the RSE is transmitted to the CID by using a separate frame buffer. The embodiment of FIG. 18 is similar to the afore-described embodiment of FIG. 17, except that buffers FB1 (UI) and FB2 (UI) are additionally defined for an overlaid UI (partial mirroring). For the partial mirroring, FIGS. 11 and 12 may be referred to.

For example, as illustrated in FIG. 18, upon detection of a touch, for example, a touch on a POI for partial mirroring (S1809) during execution of an application (S1808), the second SoC transmits a touch ID and coordinates to the first SoC (S1803). In response, the first SoC updates the frame buffer (S1802) during execution of an application (S1801) and transmits FB2 (UI) among frame buffers 51850 illustrated in FIG. 18 to the second SoC (S1804).

In response, the second SoC updates the RSE (S1810) and determines whether mirroring is needed (S1811). When determining that mirroring is not needed, the second SoC maintains a current screen (S1812). When determining that mirroring is needed, the second SoC transmits a mirroring request signal to the first SoC (S1805). In response, the first SoC updates the frame buffers (S1806) and updates the CID (S1807).

The above embodiments of the present disclosure may be implemented in various means, for example, hardware, firmware, software, or a combination thereof.

In a hardware configuration, the methods according to embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and so on.

In a firmware or software configuration, the methods according to the embodiments of the present disclosure may be implemented in the form of a module, a procedure, a function, or the like. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

In addition, both the product invention and the method invention are described herein, and the description of both inventions may be applied supplementarily when needed.

Various embodiments have been described in the best mode for carrying out the disclosure.

The present disclosure is applicable to all of various display devices and SoCs in a vehicle, and thus its industrial applicability is acknowledged.

What is claimed is:

1. A method of controlling a device provided in a vehicle, the method comprising:
   executing a first application by a first system-on-chip (SoC);
   outputting first video data corresponding to the first application by the first SoC;
   generating a frame buffer for the first video data by the first SoC;
   transmitting the generated frame buffer to a second SoC;
   outputting the same video data as the first video data at a first time by the second SoC;
   outputting second video data different from the first video data in response to an event that has occurred at a second time after the first time by the second SoC;
   transmitting a touch identifier (ID) and coordinates to the first SoC when a touch for partial mirroring is detected by the second SoC;
   updating an additionally defined UI frame buffer, by the first SoC; and
   transmitting the updated UI frame buffer to the second SoC, by the first SoC.

2. The method according to claim 1, wherein the first video data is transmitted to the second SoC by the first SoC until before the event occurs.

3. The method according to claim 2, further comprising:
   receiving information corresponding to the first application from the first SoC, by the second SoC;
   determining whether the first application is received based on the received information, by the second SoC; and
   executing a second application identical to or corresponding to the first application in response to the event by the second SoC.

4. The method according to claim 3, wherein the frame buffer for the first video data is generated and transmitted to the second SoC by the first SoC until before the event occurs.

5. The method according to claim 4, wherein after the event occurs, the generation of the frame buffer for the first video data is discontinued by the first SoC.

6. The method according to claim 5, further comprising transmitting a command related to a specific first type of event to the first SoC only in response to the specific first type of event which has occurred at a third time after the second time, by the second SoC.

7. The method according to claim 6, further comprising:
   discontinuing the execution of the second application only in response to a specific second type of event which has occurred at a fourth time after the third time, by the second SoC; and
   resuming reception of the first video data from the first SoC by the second SoC.

8. The method according to claim 3, further comprising:
   initializing a first frame buffer of the first SoC and executing the first application to be copied to the first frame buffer, by the first SoC; and
   updating a central information display (CID) of the first SoC when a touch is detected in the first SoC, by the first SoC.

9. The method according to claim 8, further comprising:
   updating a second frame buffer of the second SoC when a touch is detected in the second SoC, by the first SoC;
   transmitting the updated second frame buffer to the second SoC, by the first SoC; and
   updating a rear seat entertainment (RSE) of the second SoC, by the second SoC.

10. The method according to claim 1, further comprising:
updating a rear seat entertainment (RSE) of the second SoC based on the updated UI frame buffer, by the second SoC;
determining whether mirroring is needed
transmitting a mirroring request signal to the first SoC when determining that mirroring is needed, by the second SoC; and
updating a central information display (CID) of the first SoC corresponding to the mirroring request signal, by the first SoC.

11. The method according to claim 1, wherein the first SoC is installed in a dashboard of the vehicle, and the second SoC is installed on a back of a front seat in the vehicle by the first SoC.

12. A device provided in a vehicle, the device comprising:
a first system-on-chip (SoC) configured to execute a first application and output outputting first video data corresponding to the first application; and
a second SoC connected to the first SoC wiredly or wirelessly and configured to output the same video data as the first video data at a first time,
wherein the second SoC is configured to output second video data different from the first video data in response to an event that has occurred at a second time after the first time,
wherein the second SoC is configured to transmit a touch ID and coordinates to the first SoC when a touch for partial mirroring is detected by the second SoC, and the first SoC is configured to update an additionally defined UI frame buffer and to transmit the updated UI frame buffer to the second SoC.

13. The device according to claim 12, wherein the first SoC is installed on a dashboard of the vehicle, and the second SoC is installed on a back of a front seat in the vehicle.

14. The device according to claim 13, wherein the second SoC is configured to execute a second application identical to or corresponding to the first application in response to the event.

* * * * *